US010891771B2

(12) United States Patent
Mitsui et al.

(10) Patent No.: US 10,891,771 B2
(45) Date of Patent: *Jan. 12, 2021

(54) INFORMATION PROCESSING APPARATUS FOR CREATING AN ANIMATION FROM A SPHERICAL IMAGE

(71) Applicant: RICOH COMPANY, LTD., Tokyo (JP)

(72) Inventors: Satoshi Mitsui, Kanagawa (JP); Masato Takada, Kanagawa (JP); Hitomi Mizutani, Kanagawa (JP); Keitaro Shimizu, Chiba (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/793,793

(22) Filed: Feb. 18, 2020

(65) Prior Publication Data
US 2020/0184698 A1 Jun. 11, 2020

Related U.S. Application Data

(63) Continuation of application No. 15/825,216, filed on Nov. 29, 2017, now Pat. No. 10,614,606.

(30) Foreign Application Priority Data

Nov. 30, 2016 (JP) .................................. 2016-233059
Feb. 28, 2017 (JP) .................................. 2017-037632
Sep. 26, 2017 (JP) .................................. 2017-185161

(51) Int. Cl.
*G06T 13/20* (2011.01)
*G06T 19/00* (2011.01)
(Continued)

(52) U.S. Cl.
CPC .......... *G06T 13/20* (2013.01); *G06F 3/04815* (2013.01); *G06F 3/04845* (2013.01);
(Continued)

(58) Field of Classification Search
CPC . G06T 13/00–80; G06T 15/04; G06T 19/003; H04N 5/23238; H04N 5/232935;
(Continued)

(56) References Cited

U.S. PATENT DOCUMENTS 8,903,224 B1 12/2014 Shah
2011/0069085 A1 3/2011 Weber
(Continued)

FOREIGN PATENT DOCUMENTS

| JP | 2015-018013 | | 1/2015 | |
| JP | 2015-176560 A | * | 10/2015 | ............... G06T 3/00 |
| JP | 2016-158021 | | 9/2016 | |

OTHER PUBLICATIONS

Akenine-Moller, Thomas and Eric Haines. "Real-time rendering." 2nd ed. (2002), pp. 482-486. (Year; 2002).

*Primary Examiner* — Daniel F Hajnik
(74) *Attorney, Agent, or Firm* — Oblon, McClelland, Maier & Neustadt, L.L.P.

(57) ABSTRACT

An information processing apparatus includes circuitry to register at least a first viewpoint and a second viewpoint designated next to the first viewpoint as viewpoints in a full-view spherical image with an order designated by a user, set a transition path of the viewpoints from the first viewpoint to the second viewpoint by interpolating between the first viewpoint and the second viewpoint in the full-view spherical image, generate a first partial image having a center that matches the first viewpoint, and a second partial image having a center that matches the second viewpoint, and play animation by sequentially displaying the first partial image and the second partial image with the order designated by the user while transiting the viewpoints from the first viewpoint to the second viewpoint along the set transition path.

20 Claims, 37 Drawing Sheets

(51) Int. Cl.
*G06F 3/0484* (2013.01)
*G06F 3/0481* (2013.01)
*H04N 5/232* (2006.01)

(52) U.S. Cl.
CPC ........ *G06F 3/04847* (2013.01); *G06T 19/003* (2013.01); *H04N 5/23238* (2013.01); *H04N 5/232935* (2018.08); *G06F 2203/04806* (2013.01)

(58) Field of Classification Search
CPC ............. G06F 3/04815; G06F 3/04845; G06F 3/04847; G06F 2203/04806
See application file for complete search history.

(56) References Cited

U.S. PATENT DOCUMENTS

| | | |
|---|---|---|
| 2011/0239147 A1 | 9/2011 | Shim |
| 2012/0092348 A1 | 4/2012 | McCutchen |
| 2012/0200665 A1* | 8/2012 | Furumura ............. G06T 3/0062 348/36 |
| 2012/0206565 A1* | 8/2012 | Villmer ................... H04N 1/00 348/36 |
| 2013/0044139 A1 | 2/2013 | Hernandez Esteban |
| 2013/0057542 A1 | 3/2013 | Takenaka |
| 2015/0321103 A1 | 11/2015 | Barnett |
| 2016/0027201 A1 | 1/2016 | Saito |
| 2016/0360097 A1 | 12/2016 | Penha |
| 2019/0102940 A1 | 4/2019 | Nakao |

* cited by examiner

FIG. 9
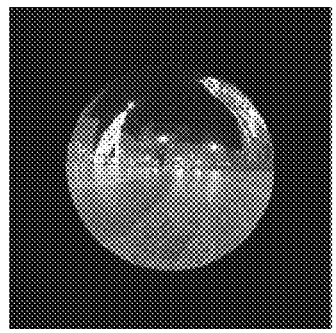
VIEWPOINT 3
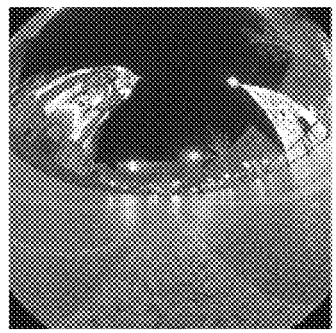
VIEWPOINT 4
VIEWPOINT 5
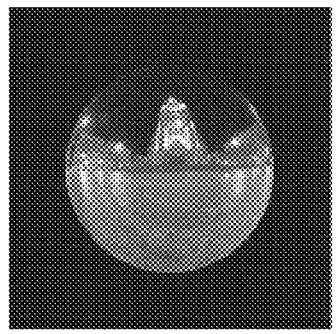
VIEWPOINT 6

FIG. 10
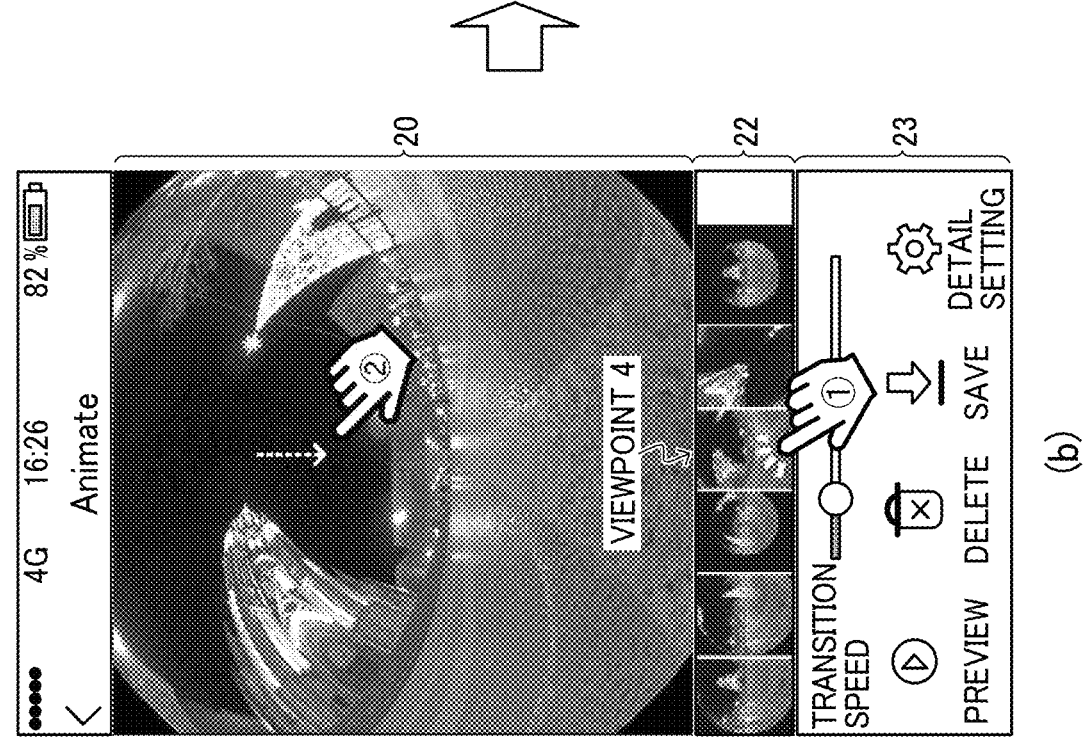
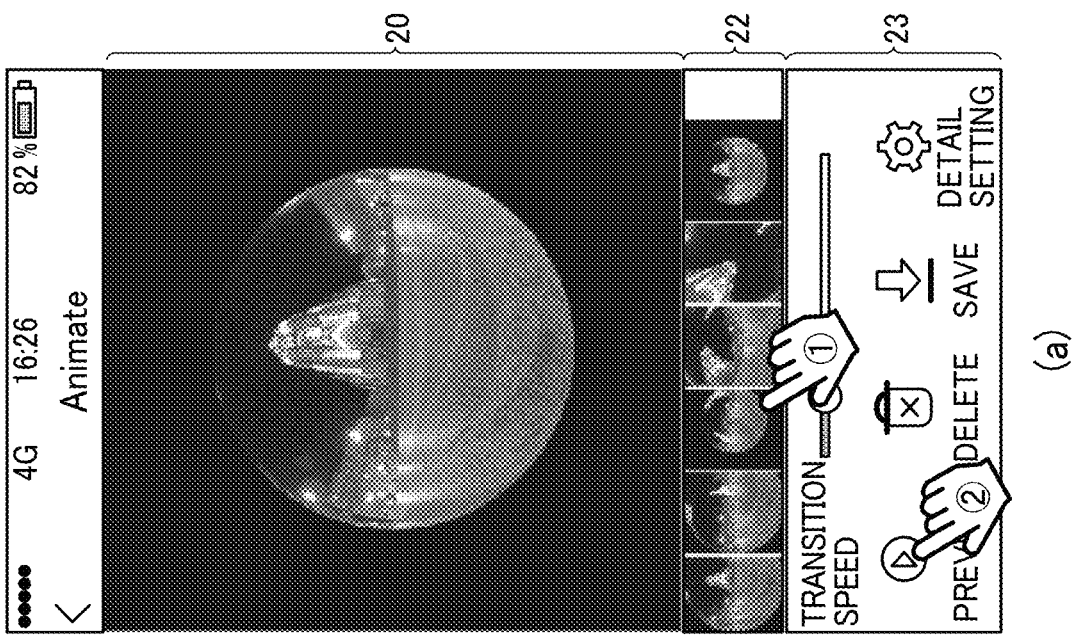

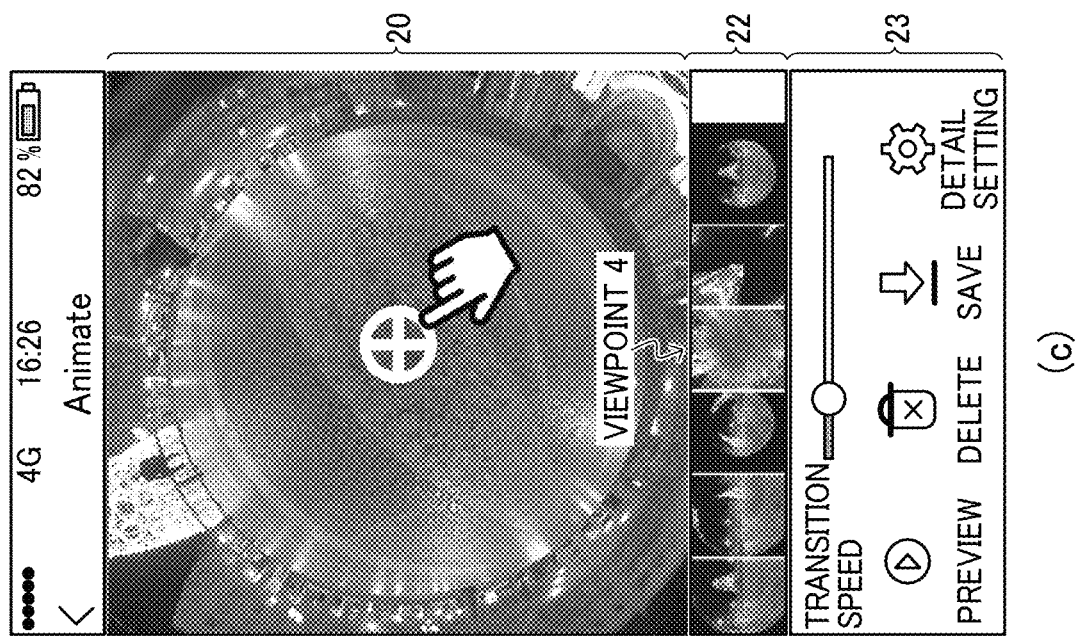

FIG. 11A    FIG. 11 | FIG. 11A | FIG. 11B
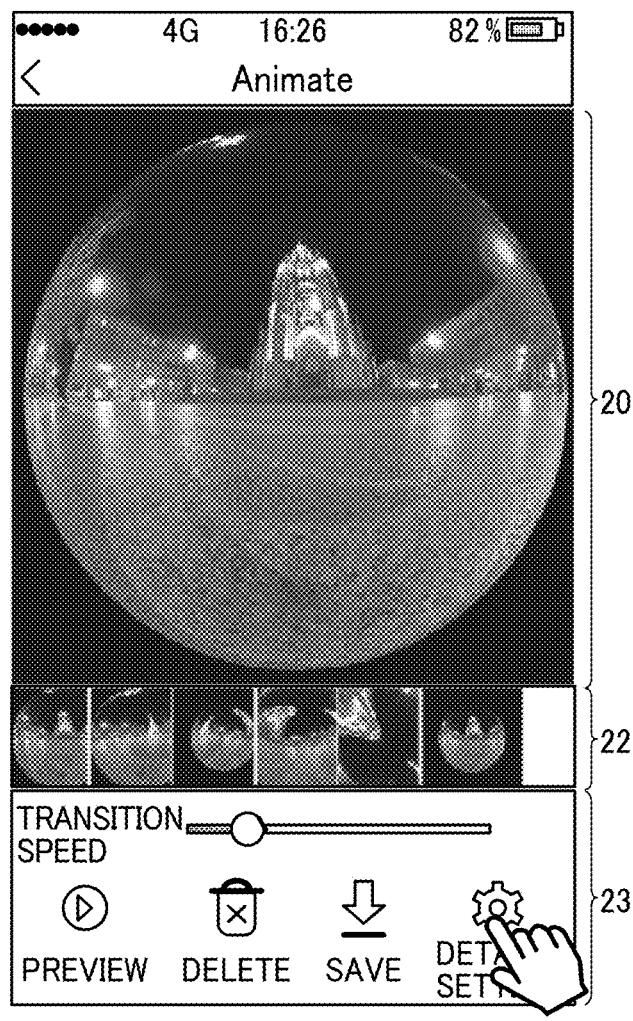
(a)

(b)

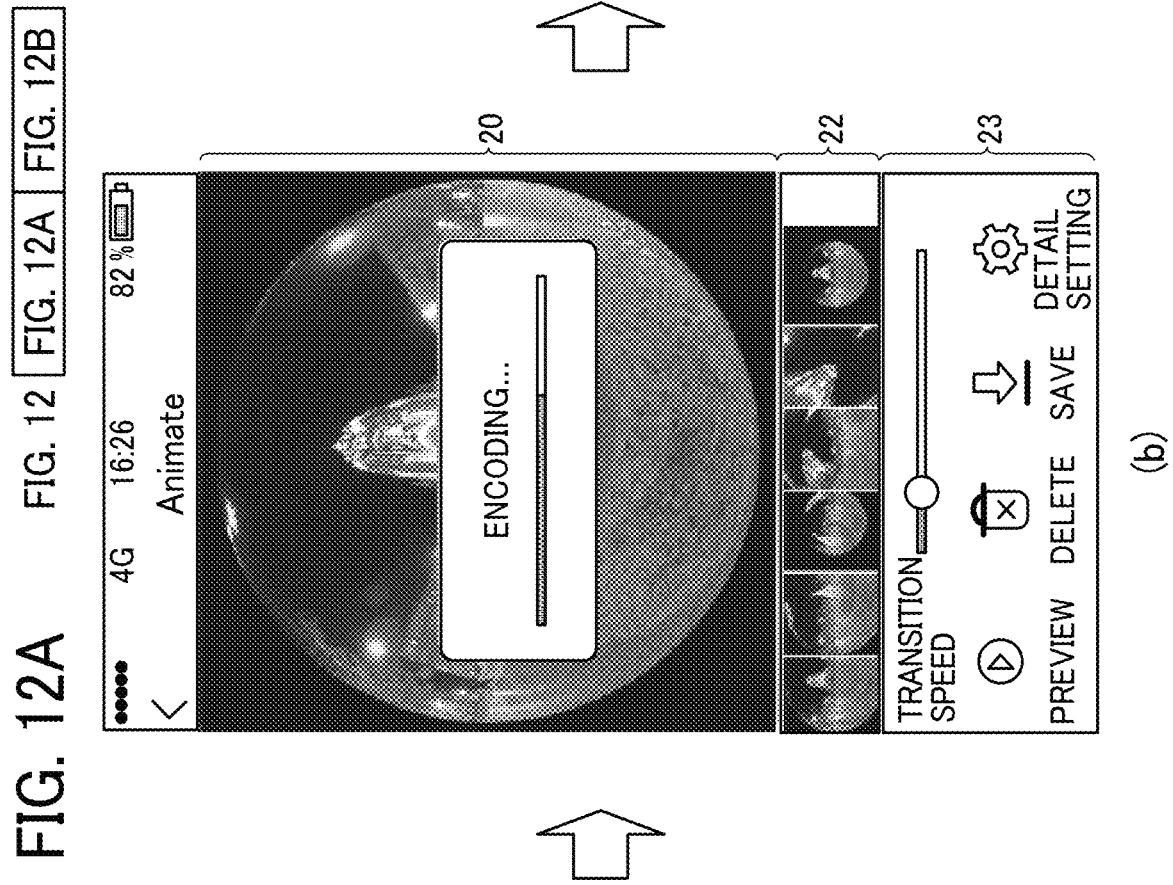
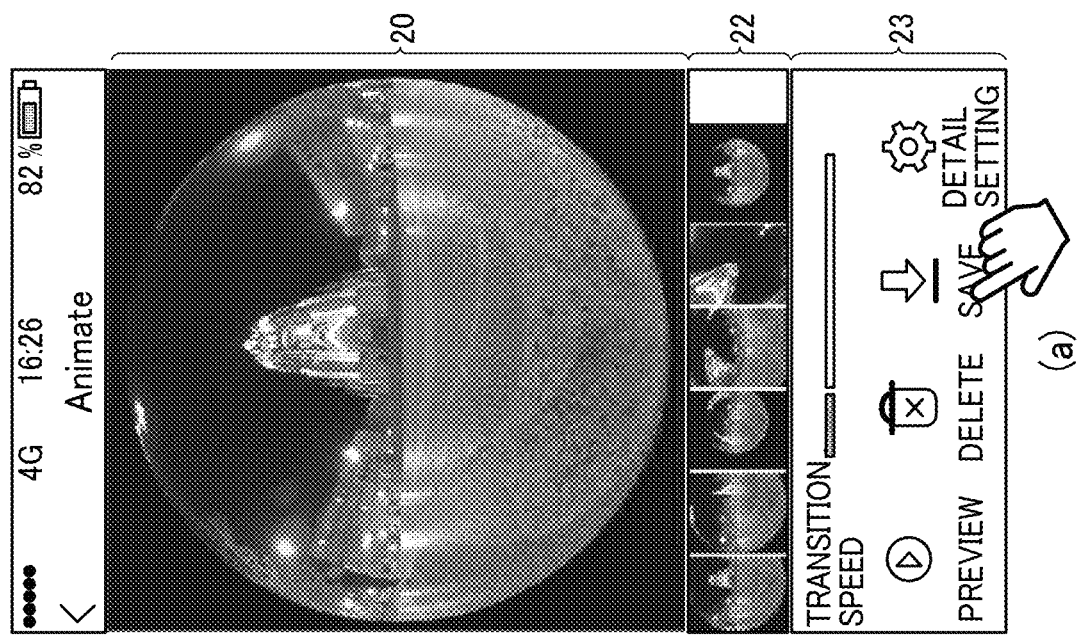
FIG. 12

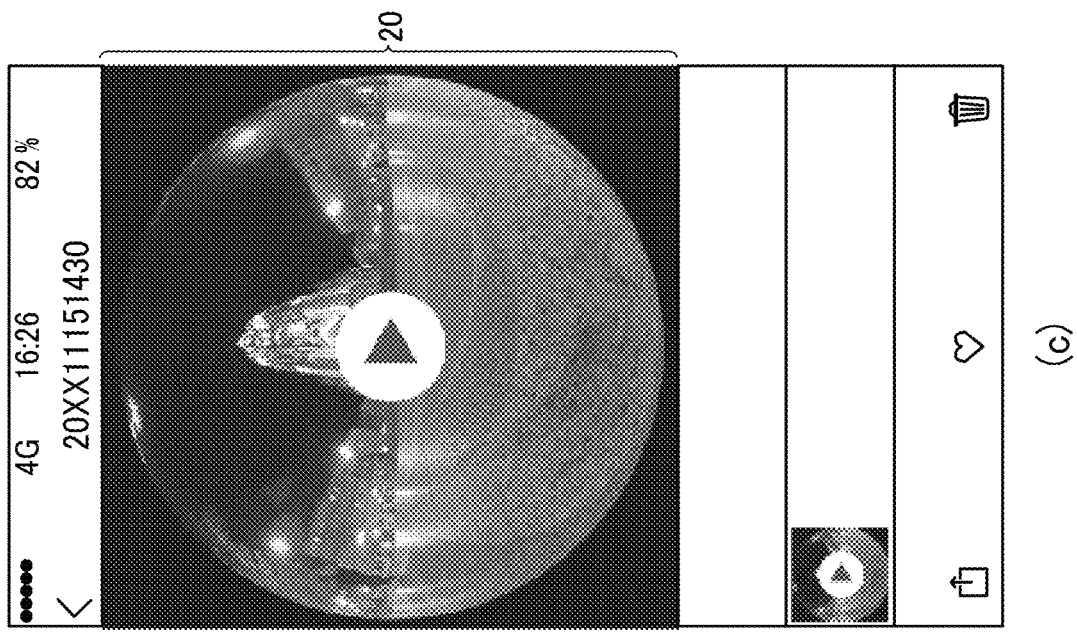

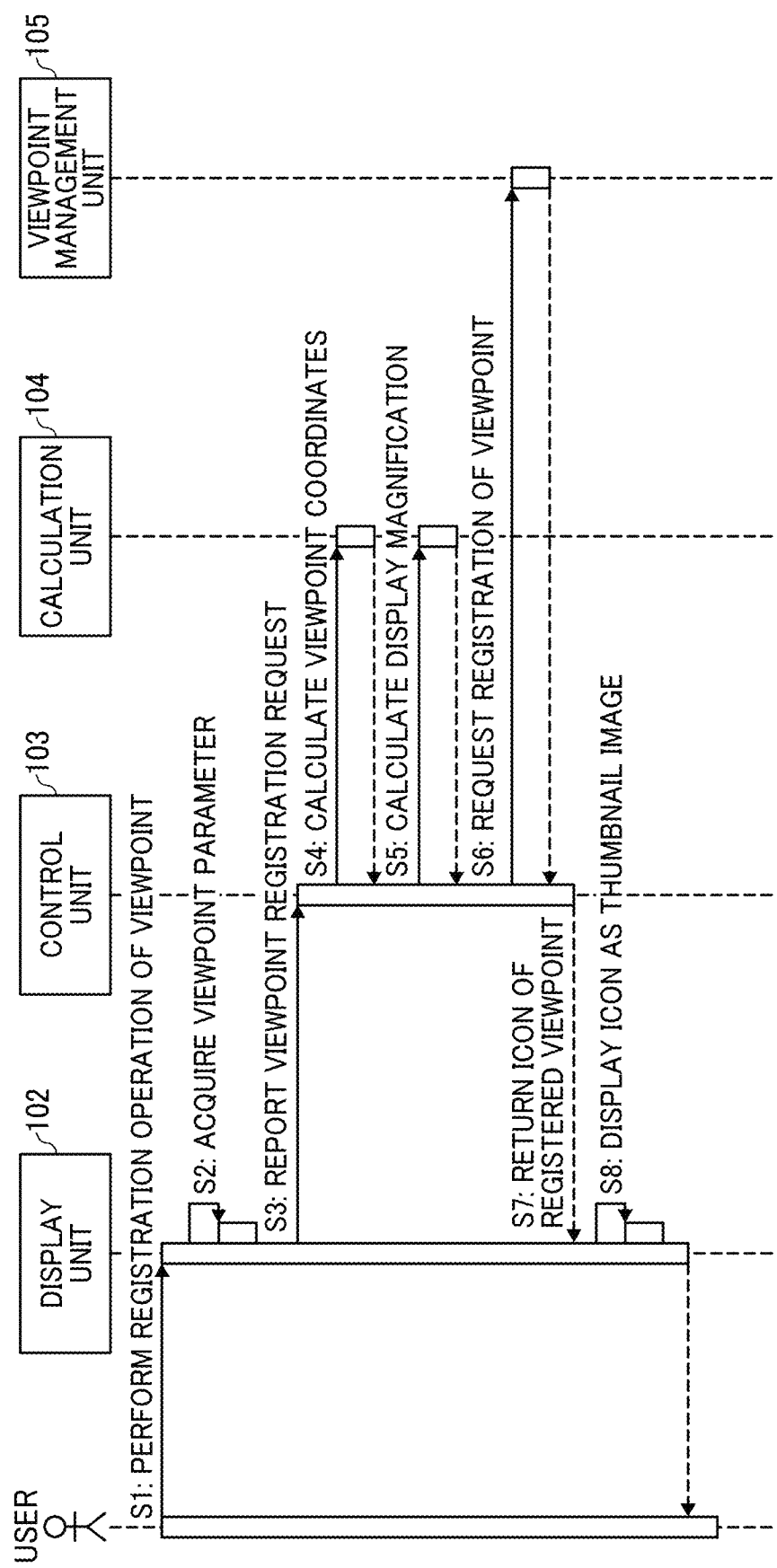

FIG. 14A

VIEWPOINT INFORMATION MANAGEMENT TABLE 500

| REGISTERED VIEWPOINT 501 | HORIZONTAL ANGLE (θ) 502 | ELEVATION ANGLE (φ) 503 | DISPLAY MAGNIFICATION 504 | TRANSITION SPEED 505 | TRANSITION TIME 506 | EASING CURVE 507 |
|---|---|---|---|---|---|---|
| 1 | 0 | 0 | 1 | 1 | - | linear |

FIG. 14B

VIEWPOINT INFORMATION MANAGEMENT TABLE 500

| REGISTERED VIEWPOINT 501 | HORIZONTAL ANGLE (θ) 502 | ELEVATION ANGLE (φ) 503 | DISPLAY MAGNIFICATION 504 | TRANSITION SPEED 505 | TRANSITION TIME 506 | EASING CURVE 507 |
|---|---|---|---|---|---|---|
| 1 | 0 | 0 | 1 | 1 | - | linear |
| 2 | 80 | 0 | 1 | 1 | - | linear |
| 3 | 80 | 30 | 2 | 2 | - | linear |
| 4 | 10 | 30 | 2 | 3 | - | linear |
| 5 | 40 | 50 | 1 | 2 | - | linear |
| 6 | 40 | 60 | 2 | NONE | NONE | NONE |

FIG. 14C

VIEWPOINT INFORMATION MANAGEMENT TABLE 550

| REGISTERED VIEWPOINT 501 | HORIZONTAL ANGLE (θ) 502 | ELEVATION ANGLE (φ) 503 | DISPLAY MAGNIFICATION 504 | TRANSITION SPEED 505 | TRANSITION TIME 506 | EASING CURVE 507 | TRANSITION DIRECTION 508 |
|---|---|---|---|---|---|---|---|
| 1 | 0 | 0 | 1 | 1 | – | linear | LEFT |
| 2 | 80 | 0 | 1 | 1 | – | linear | RIGHT |
| 3 | 80 | 30 | 2 | 2 | – | linear | LEFT |
| 4 | 10 | 30 | 2 | 3 | – | linear | UP |
| 5 | 40 | 50 | 1 | 2 | – | linear | DOWN |
| 6 | 40 | 60 | 2 | NONE | NONE | NONE | NONE |

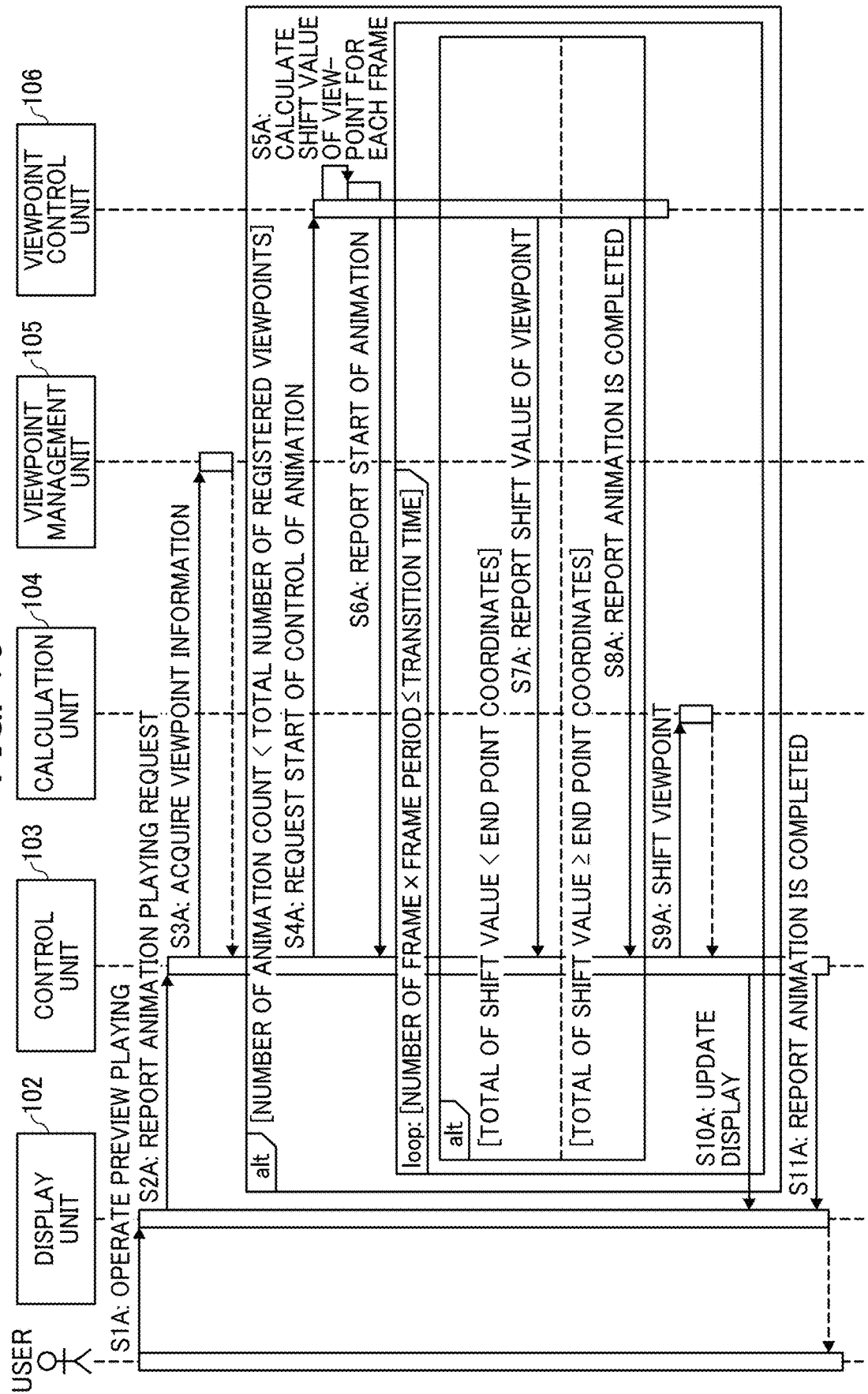

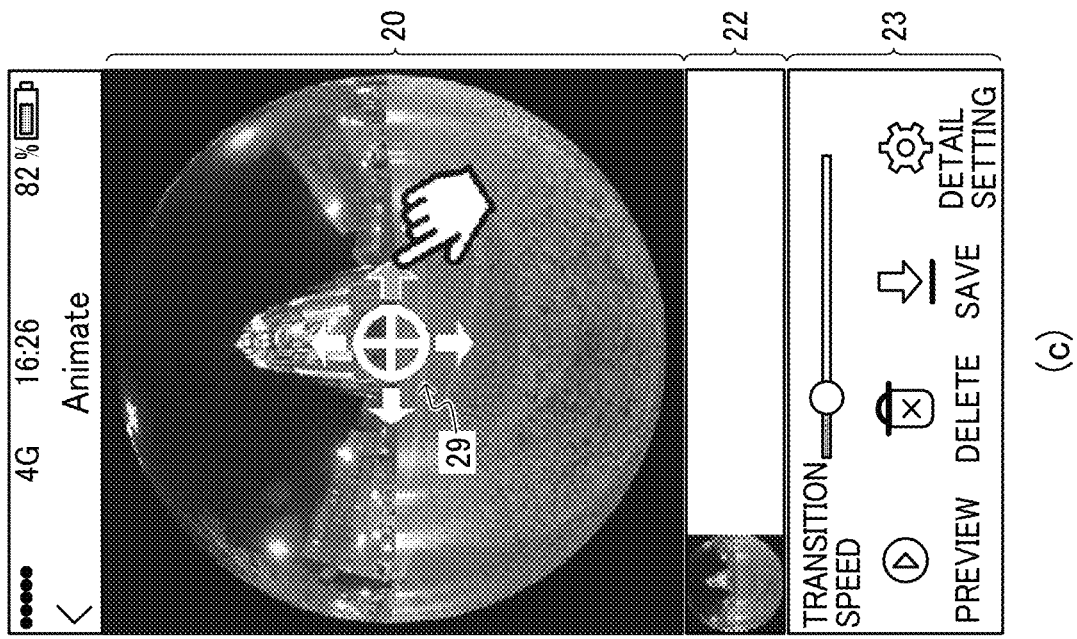

FIG. 17A
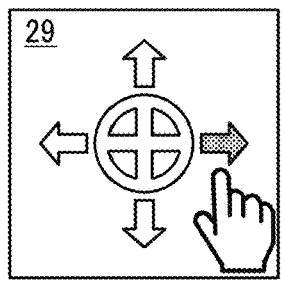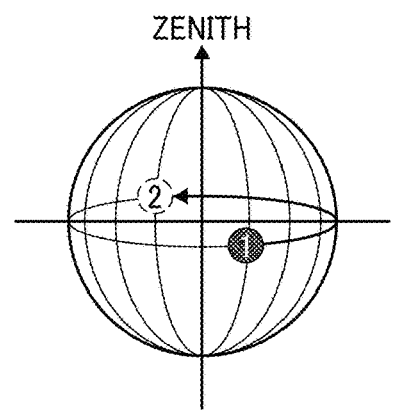
FIG. 17B
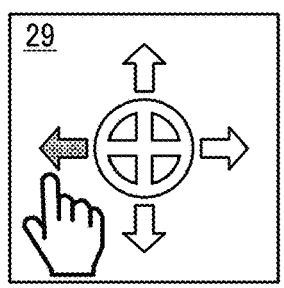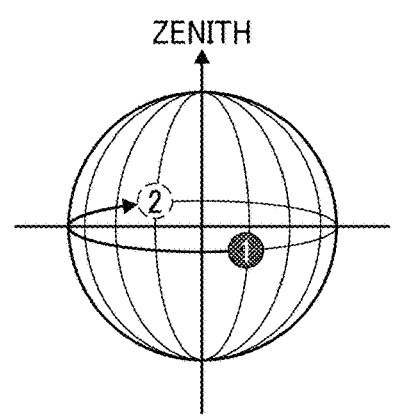
FIG. 17C
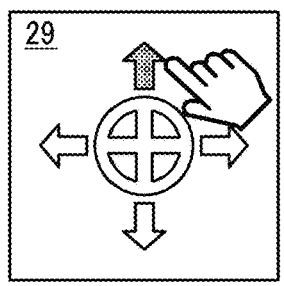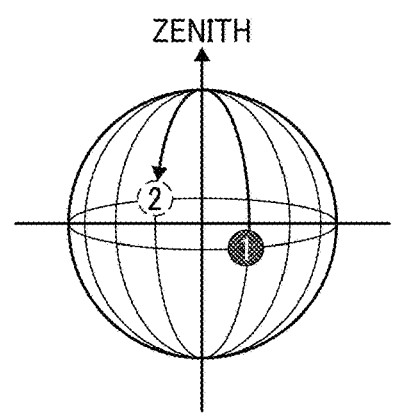
FIG. 17D
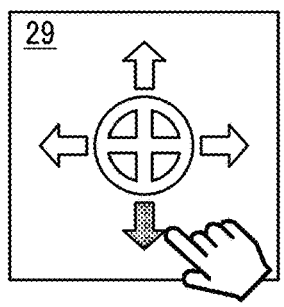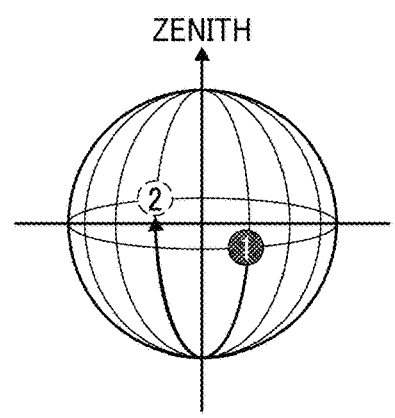

PRESET DATA (a)

| REGISTERED VIEWPOINT | HORIZONTAL ANGLE (θ) | ELEVATION ANGLE (φ) | DISPLAY MAGNIFICATION |
|---|---|---|---|
| 1 | 0 | 0 | 1 |
| 2 | 80 | 0 | 1 |
| 3 | 80 | 30 | 2 |
| 4 | 10 | 30 | 2 |
| 5 | 40 | 50 | 1 |
| 6 | 40 | 60 | 2 |

(b)

| REGISTERED VIEWPOINT | HORIZONTAL ANGLE (θ) | ELEVATION ANGLE (φ) | DISPLAY MAGNIFICATION |
|---|---|---|---|
| 1 | 0 | 0 | 1 |
| 2 | 80 | 0 | 1 |
| 3 | 80 | 30 | 2 |
| 4 | 10 | 30 | 2 |
| 5 | 40 | 50 | 1 |
| 6 | 40 | ☆ 90 | ☆ 3 |

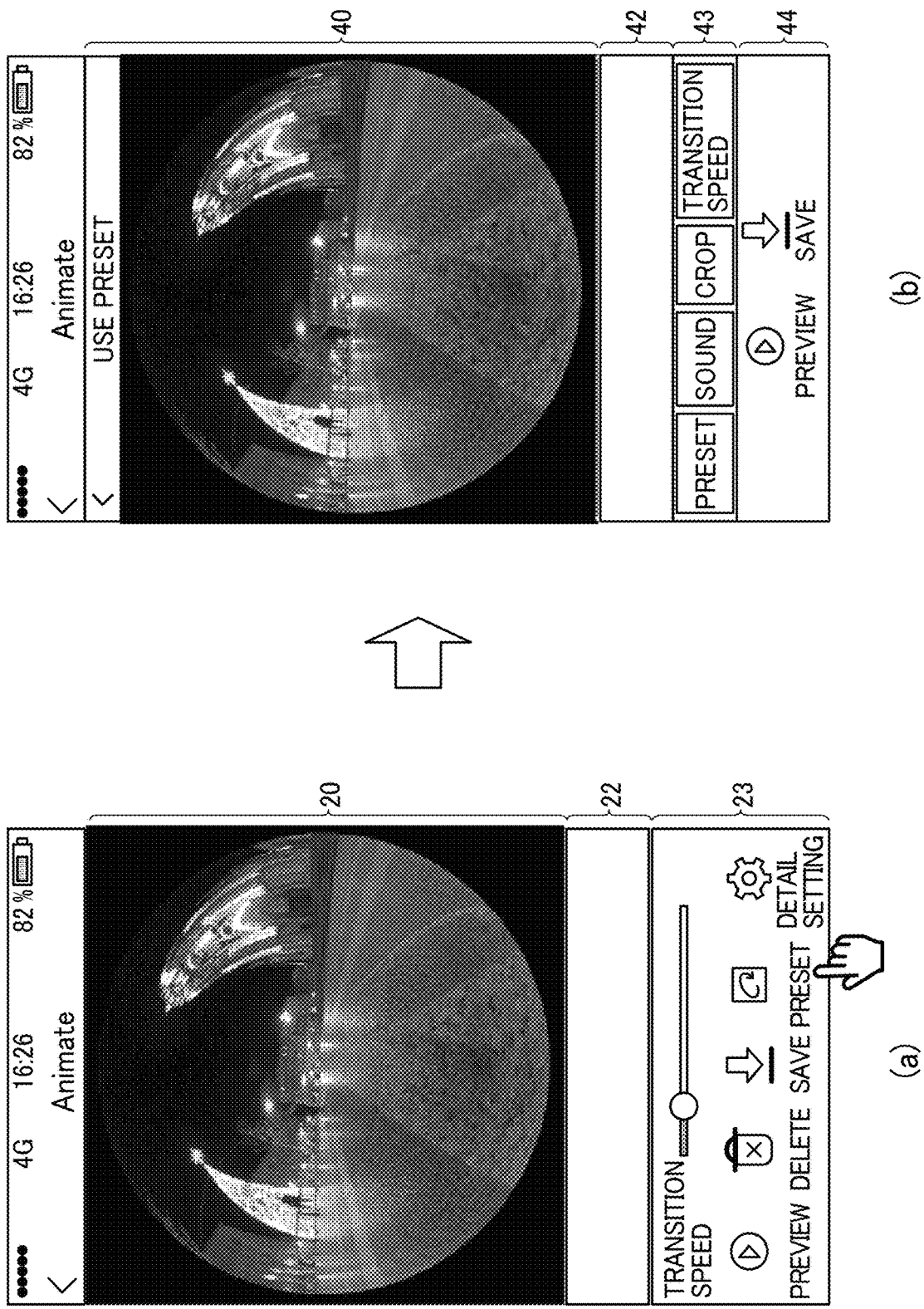

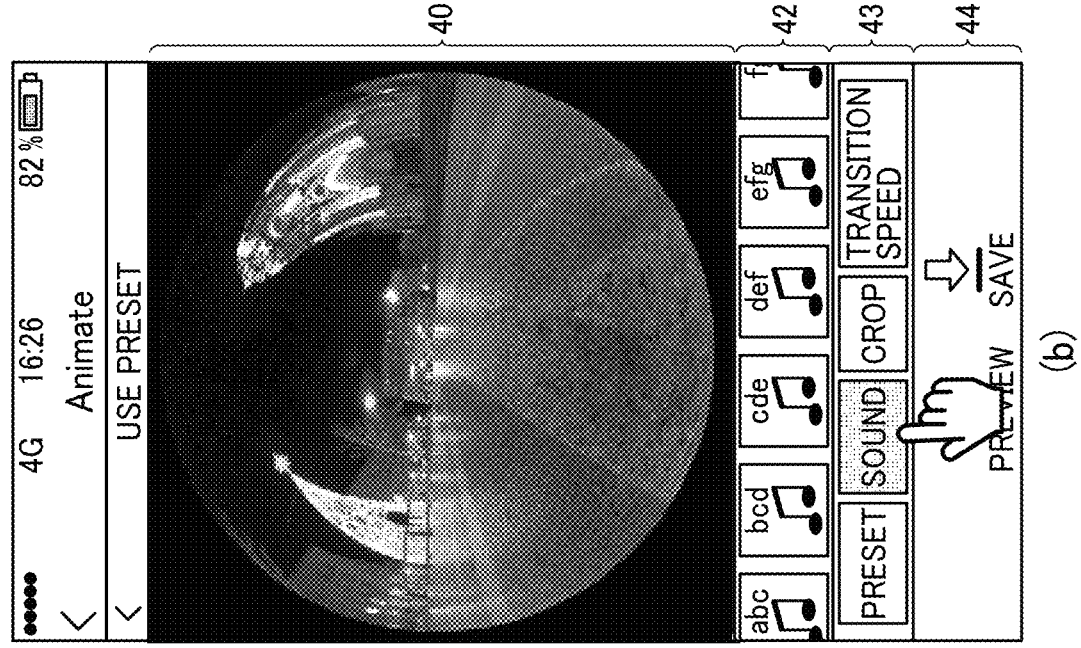
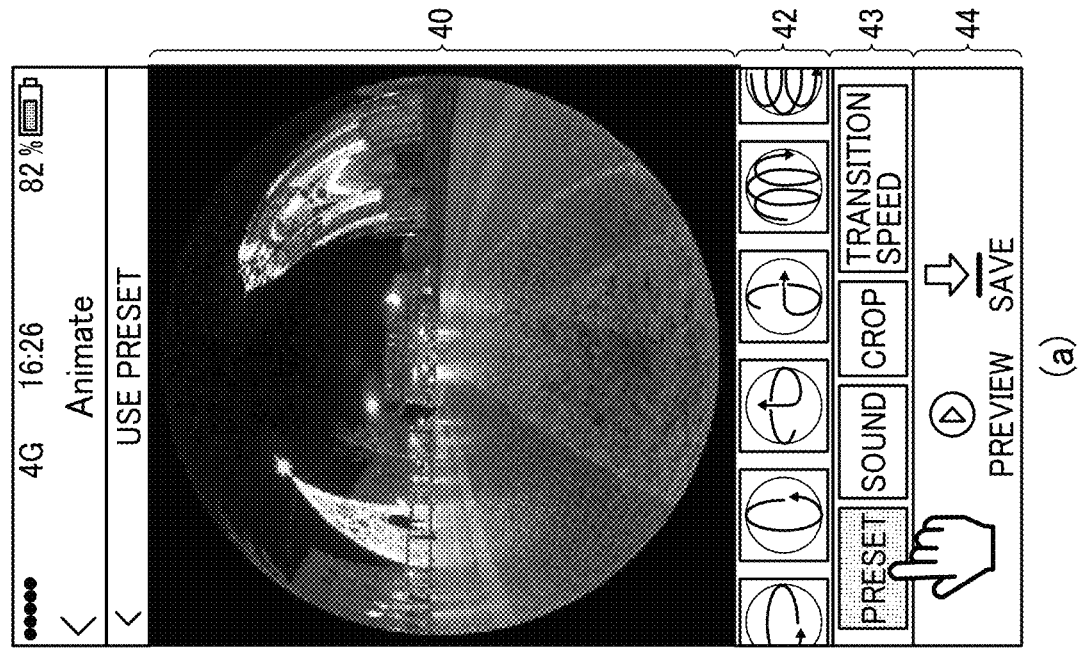
FIG. 20A
FIG. 20B

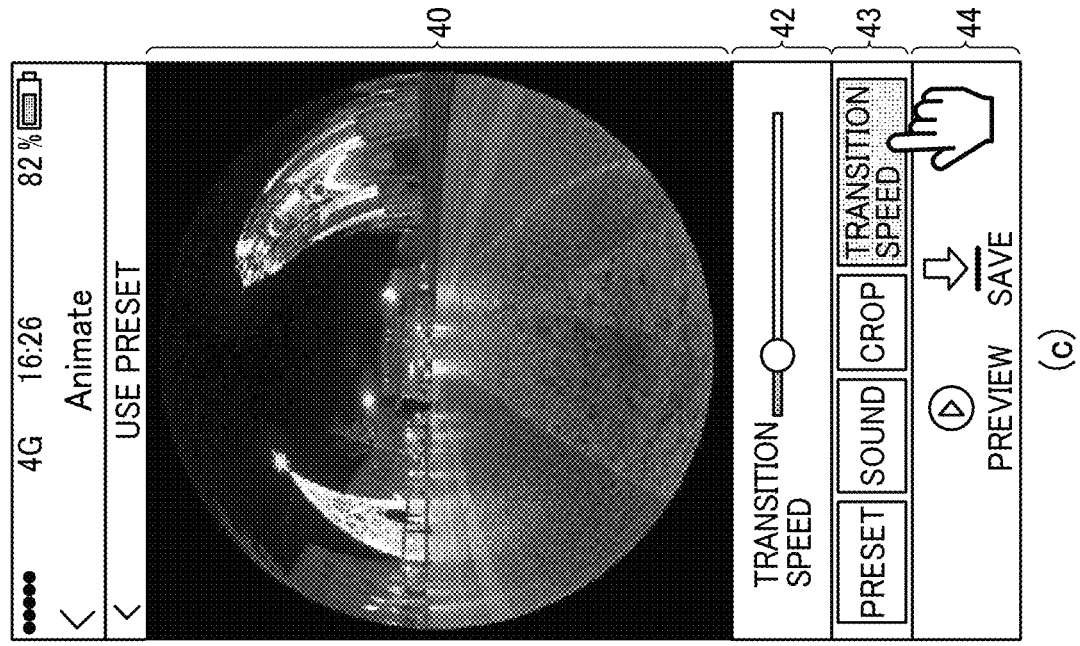

FIG. 21
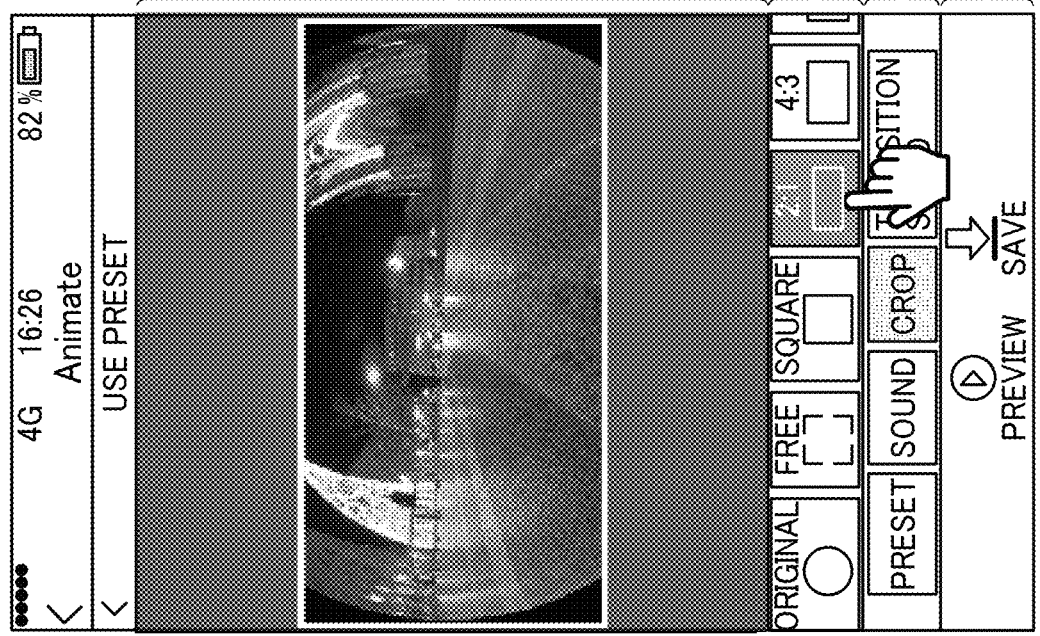
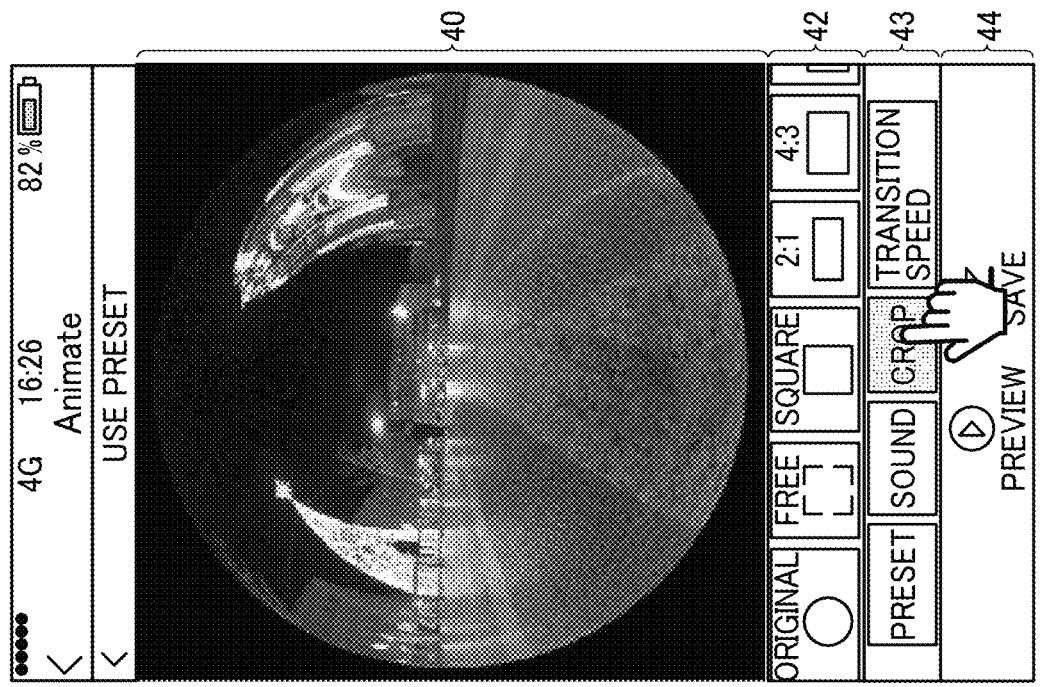

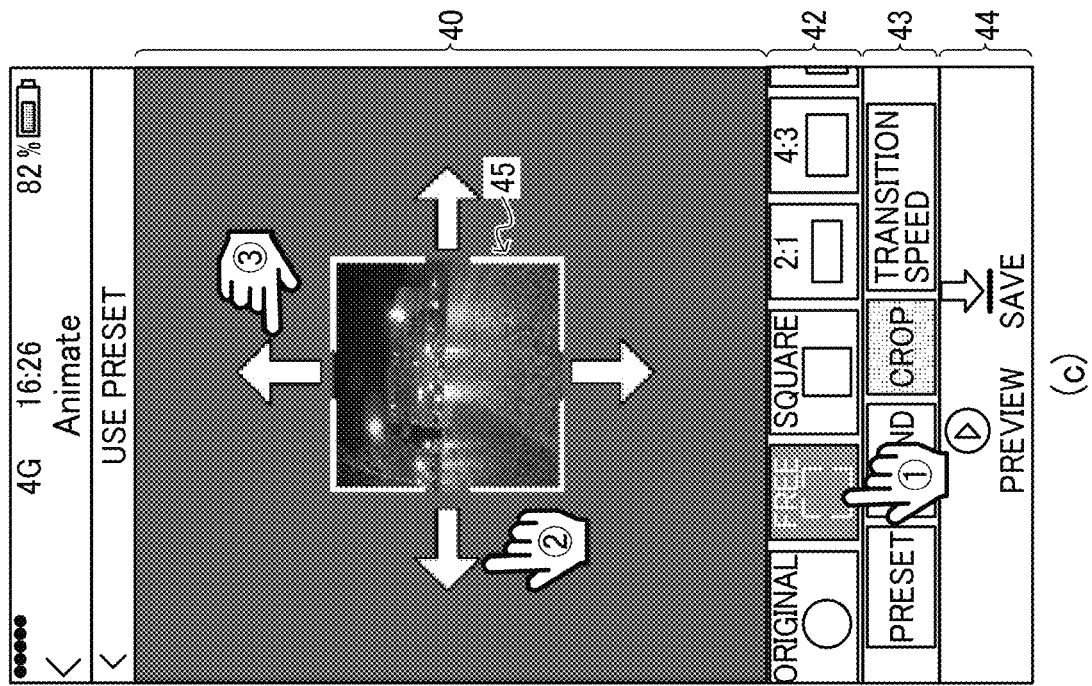

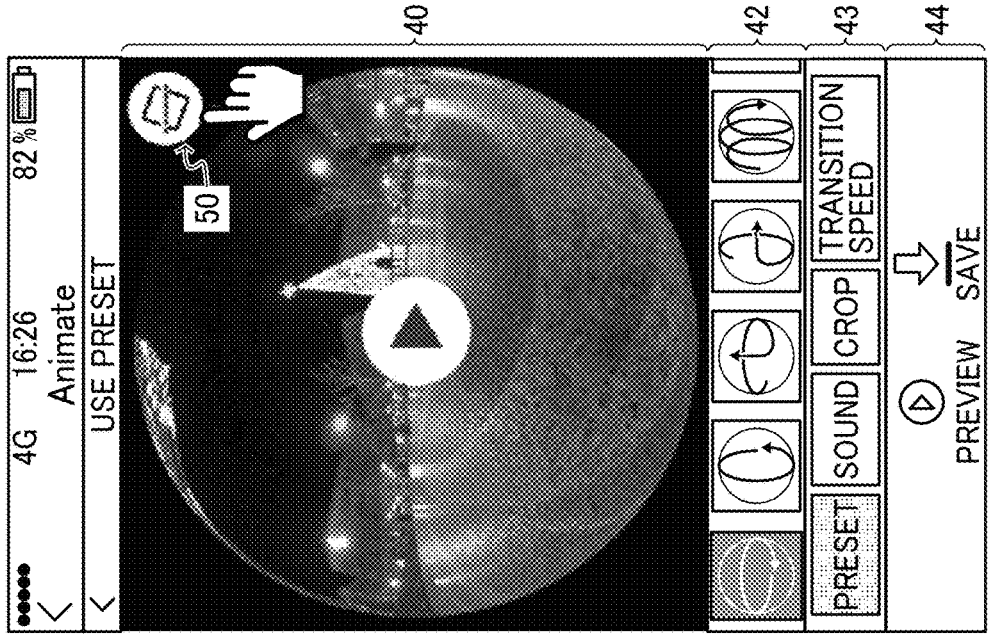
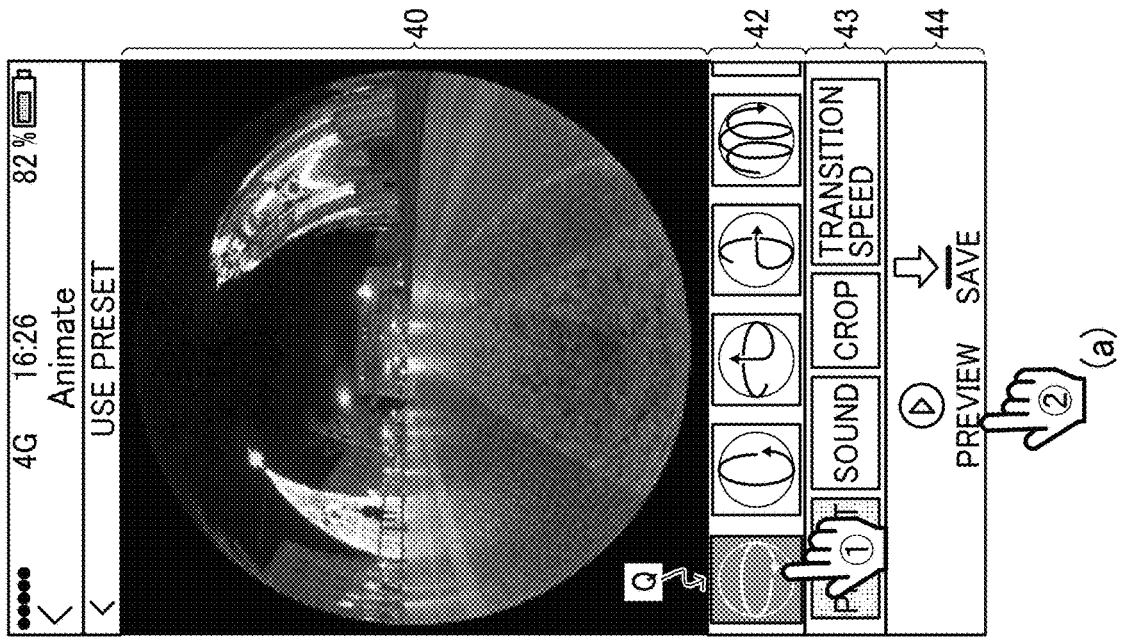
FIG. 22A
FIG. 22B

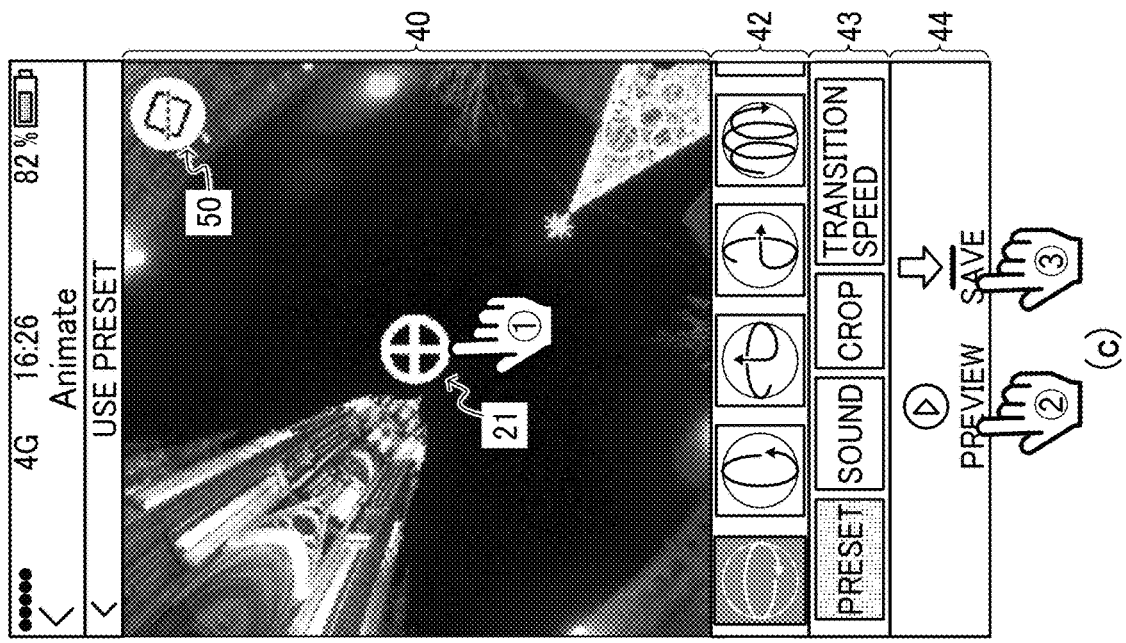

FIG. 23
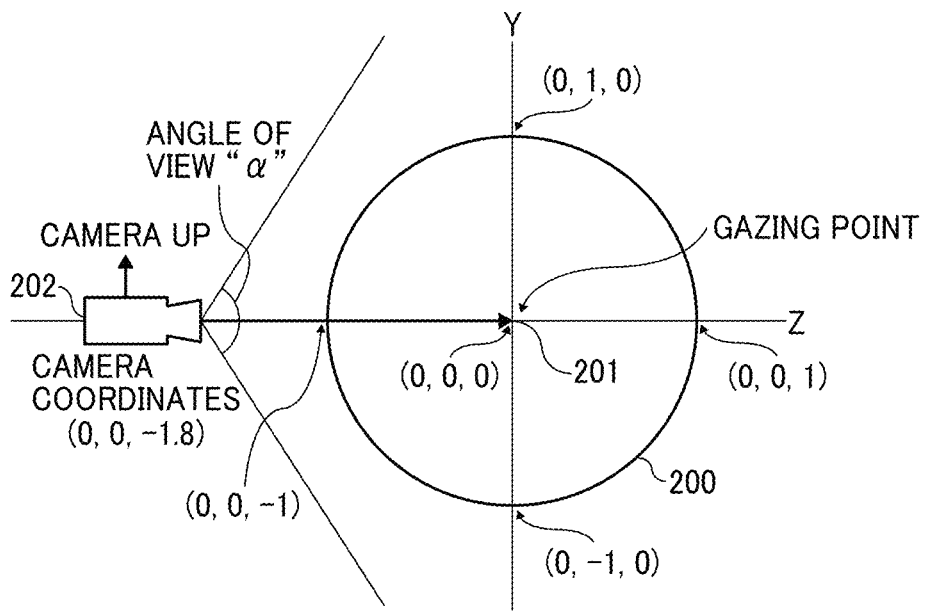
FIG. 24A
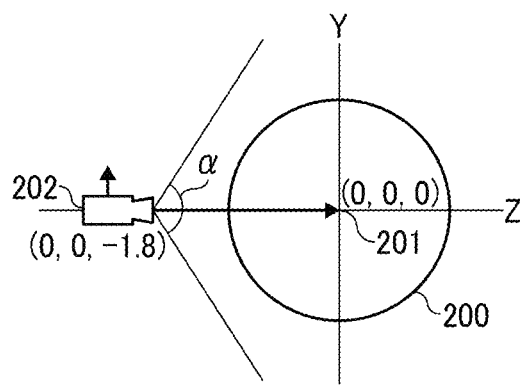
FIG. 24B
| PARAMETER | INITIAL VALUE |
|---|---|
| ANGLE OF VIEW "α" | 120° |
| CAMERA COORDINATES | (0, 0, −1.8) |
| CAMERA UP | (0, 1, 0) |
| CAMERA GAZING POINT | (0, 0, 0) |

FIG. 25A
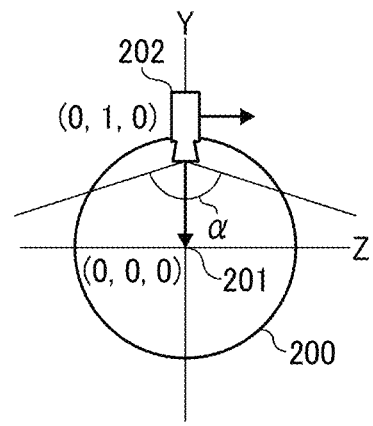
FIG. 25B
| PARAMETER | INITIAL VALUE |
|---|---|
| ANGLE OF VIEW "α" | 170° |
| CAMERA COORDINATES | (0, 1, 0) |
| CAMERA UP | (0, 0, 1) |
| CAMERA GAZING POINT | (0, 0, 0) |
FIG. 26A
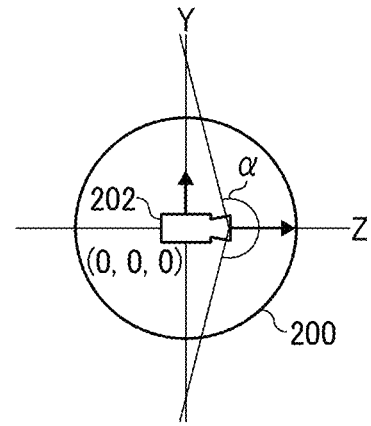
FIG. 26B
| PARAMETER | INITIAL VALUE |
|---|---|
| ANGLE OF VIEW "α" | 205° |
| CAMERA COORDINATES | (0, 0, 0) |
| CAMERA UP | (0, 1, 0) |
| CAMERA GAZING POINT | (0, 0, 1) |

INFORMATION PROCESSING APPARATUS FOR CREATING AN ANIMATION FROM A SPHERICAL IMAGE

CROSS-REFERENCE TO RELATED APPLICATION

This application is a continuation Application of U.S. application Ser. No. 15/825,216, filed Nov. 29, 2017, which is claims priority pursuant to 35 U.S.C. § 119(a) to Japanese Patent Applications Nos. 2016-233059, filed on Nov. 30, 2016, 2017-037632, filed on Feb. 28, 2017, and 2017-185161, filed on Sep. 26, 2017 in the Japan Patent Office. The entire contents of the above-identified applications are incorporated herein by reference.

BACKGROUND

Technical Field

This disclosure relates to an information processing apparatus, a method of processing information, and a storage medium.

Background Art

Lately, full-view spherical cameras or omnidirectional cameras are used in many situations, in which a full-view spherical image or omnidirectional image covering an omnidirectional scene is captured, and the full-view spherical image can be viewed using a dedicated viewer. The dedicated viewer of the full-view spherical image is an application that maps the full-view spherical image on a surface of a virtual three dimensional object to generate a three dimensional model, and performs a projective transformation to a partial region of the three dimensional model of the full-view spherical image based on a display-range changing operation by a user such as pan, tilt, and zoom to display a two dimensional image.

When the user wants to find an area of interest in the full-view spherical image by using conventional dedicated viewers, the user needs to perform a manual operation such as pan, tilt, and zoom for changing a display area of the full-view spherical image to search the area of interest by checking the entire of the full-view spherical image using eyes of the user, which is not convenient for the user.

SUMMARY

As one aspect of the present invention, an information processing apparatus is devised. The information processing apparatus includes circuitry to register at least a first viewpoint and a second viewpoint designated next to the first viewpoint as viewpoints in a full-view spherical image with an order designated by a user, set a transition path of the viewpoints from the first viewpoint to the second viewpoint by interpolating between the first viewpoint and the second viewpoint in the full-view spherical image, generate a first partial image having a center that matches the first viewpoint, and a second partial image having a center that matches the second viewpoint, and play animation by sequentially displaying the first partial image and the second partial image with the order designated by the user while transiting the viewpoints from the first viewpoint to the second viewpoint along the set transition path.

As another aspect of the present invention, a method of processing information is devised. The method includes registering at least a first viewpoint and a second viewpoint designated next to the first viewpoint as viewpoints in a full-view spherical image with an order designated by a user, setting a transition path of the viewpoints from the first viewpoint to the second viewpoint by interpolating between the first viewpoint and the second viewpoint in the full-view spherical image, generating a first partial image having a center that matches the first viewpoint, and a second partial image having a center that matches the second viewpoint, and playing animation by sequentially displaying the first partial image and the second partial image with the order designated by the user while transiting the viewpoints from the first viewpoint to the second viewpoint along the set transition path.

As another aspect of the present invention, a non-transitory storage medium storing one or more instructions that, when executed by one or more processors, cause the one or more processors to execute a method of processing information is devised. The method includes registering at least a first viewpoint and a second viewpoint designated next to the first viewpoint as viewpoints in a full-view spherical image with an order designated by a user, setting a transition path of the viewpoints from the first viewpoint to the second viewpoint by interpolating between the first viewpoint and the second viewpoint in the full-view spherical image, generating a first partial image having a center that matches the first viewpoint, and a second partial image having a center that matches the second viewpoint, and playing animation by sequentially displaying the first partial image and the second partial image with the order designated by the user while transiting the viewpoints from the first viewpoint to the second viewpoint along the set transition path.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 9 illustrates examples of partial images corresponding registered viewpoints;

FIGS. 10A and 10B illustrate an example of an application screen when editing a viewpoint;

FIGS. 11A and 11B illustrate an example of an application screen when setting detail settings.

FIGS. 12A and 12B illustrate an example of an application screen when generating an animation;

FIG. 13 illustrates an example of a sequence diagram of processing when registering a viewpoint;

FIGS. 14A, 14B, and 14C illustrate examples of a viewpoint information management table;

FIG. 15 illustrates an example of a sequence diagram of processing when playing a preview;

FIGS. 17A, 17B, 17C, and 17D illustrate examples of relationships between a selection of a direction instruction button and a transition direction from a first viewpoint to a second viewpoint;

FIG. 19 illustrates an example of an application screen when preset data is used;

FIGS. 20A and 20B illustrate an example of an application screen when preset data is used;

FIGS. 21A and 21B illustrate another example of an application screen when preset data is used;

FIGS. 22A and 22B illustrate another example of an application screen when preset data is used;

FIG. 23 illustrates an example of parameters used for changing an image expression;

FIGS. 24A and 24B illustrate an example of a projection type;

FIGS. 25A and 25B illustrate another example of a projection type;

FIGS. 26A and 26B illustrate another example of a projection type;

Figure 1:
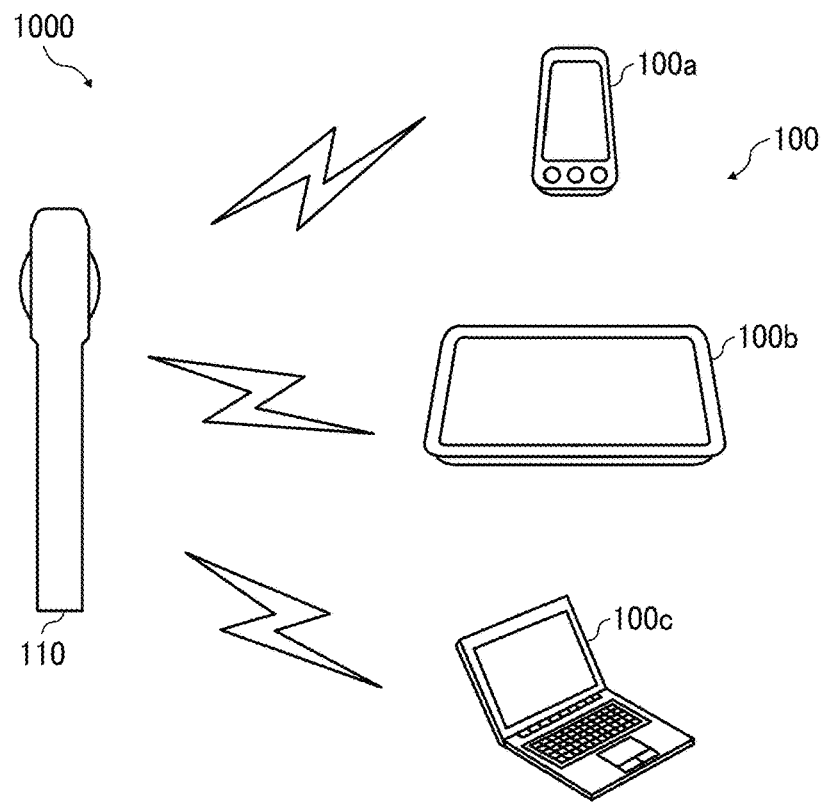
FIG. 1 illustrates an example of a schematic configuration of an image capture system including an information processing apparatus of an embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION

A description is now given of exemplary embodiments of present disclosure. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of present disclosure.

In addition, it should be noted that the terminology used herein is for the purpose of describing particular embodiments only and is not intended to be limiting of present disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof. Furthermore, although in describing views illustrated in the drawings, specific terminology is employed for the sake of clarity, the present disclosure is not limited to the specific terminology so selected and it is to be understood that each specific element includes all technical equivalents that operate in a similar manner and achieve a similar result. Referring now to the drawings, one or more apparatuses or systems according to one or more embodiments are described hereinafter.

Hereinafter, a description is given of one or more embodiments of the present invention, but the present invention is not limited to the one or embodiments to be described later. In this disclosure and drawings referred to below, the same reference numerals are used for common components and description thereof are adequately omitted.

FIG. 1 illustrates an example of a schematic configuration of an image capture system 1000 including an information processing apparatus 100 of an embodiment. The image capture system 1000 includes, for example, at least one information processing apparatus 100, and at least one image capture device 110 communicatively connected with each other. In an example configuration illustrated in FIG. 1, the image capture system 1000 includes three information processing apparatuses 100a, 100b, and 100c, and one image capture device 110, in which each of the three information processing apparatuses 100a to 100c and the image capture device 110 are connected wirelessly. Further, each of the three information processing apparatuses 100a to 100c and the image capture device 110 can be connected by wire.

The image capture device 110 can employ a full-view spherical camera or omnidirectional camera for capturing a full-view spherical image or omnidirectional image. In this disclosure, the full-view spherical image means an image that is captured almost omnidirectionally around the full-view spherical camera with one image capture operation. The full-view spherical image may not be an image exactly captured omnidirectionally with 360 degrees. For example, the full-view spherical image captured by the image capture device 110 may not include an image in a direction of several degrees or several tens of degrees from a handle of the full-view spherical camera. The full-view spherical camera includes, for example, at least two fisheye lenses, at least two image capture elements, a controller, and a communication interface as hardware components.

The fisheye lens has an angle of view of 180 degrees or more. The angle of view of the fisheye lens indicates a range of image that can be captured by a camera as a value of angle. The image capture element is disposed at a position (imaging position) where the light is focused by the fisheye lens, and converts an optical image formed by the focused light into image data of electric signal, and outputs the image data as the electric signal. The image capture element can employ, for example, an image sensor such as complementary metal oxide semiconductor (CMOS) sensor, charge coupled device (CCD) sensor or the like.

The image capture device 110 includes, for example two fisheye lenses and two image capture elements, in which one of the two fisheye lenses (i.e., first fisheye lens) is disposed at one position, and another one of the two fisheye lenses (i.e., second fisheye lens) is disposed at another position opposing the one position, with which the first fisheye lens captures one hemispherical image having an image capturing azimuth of 180 degrees or more, and the second fisheye lens captures another hemispherical image having an image capturing azimuth of 180 degrees or more.

The controller performs given processing for each of the hemispherical images, and combines or stitches the two hemispherical images to generate a full-view spherical image, and transmits the full-view spherical image to the three information processing apparatuses 100a to 100c that request the full-view spherical image via the communication interface. The full-view spherical camera has the above described configuration. Since the hardware configuration and functions of the full-view spherical camera is known, the detailed hardware configuration and functions of the full-view spherical camera is not described.

Each of the three information processing apparatuses 100a to 100c communicates with the image capture device 110 wirelessly to acquire a full-view spherical image captured by the image capture device 110, and displays the full-view spherical image on a display used by each of the three information processing apparatuses 100a to 100c. Each of the three information processing apparatuses 100a to 100c can be any apparatuses that can communicate with the image capture device 110 wirelessly, can display the acquired full-view spherical image, and can perform various processing to the full-view spherical image. In an example case illustrated in FIG. 1, the information processing apparatus 100a is, for example, a smart phone, the information processing apparatus 100b is, for example, a tablet personal computer (PC), and the information processing apparatus 100c is, for example, a notebook personal computer (PC). The information processing apparatus 100 is not limited to these, but can be a desktop PC, a digital camera, a projector, an electronic information board, and a multifunction peripheral (MFP).

In an example case illustrated in FIG. 1, the three information processing apparatuses 100a to 100c and the image capture device 110 are wirelessly connected by a wireless local area network (LAN) or the like, but not limited to thereto. For example, the three information processing apparatuses 100a to 100c and the image capture device 110 can be connected by wire such as a cable or the like. Further, the connection of the three information processing apparatuses 100a to 100c and the image capture device 110 is not limited to the direct wireless connection or direct wired connection, but the three information processing apparatuses 100a to 100c and the image capture device 110 can be connected via a network such as the Internet.

Figure 2:
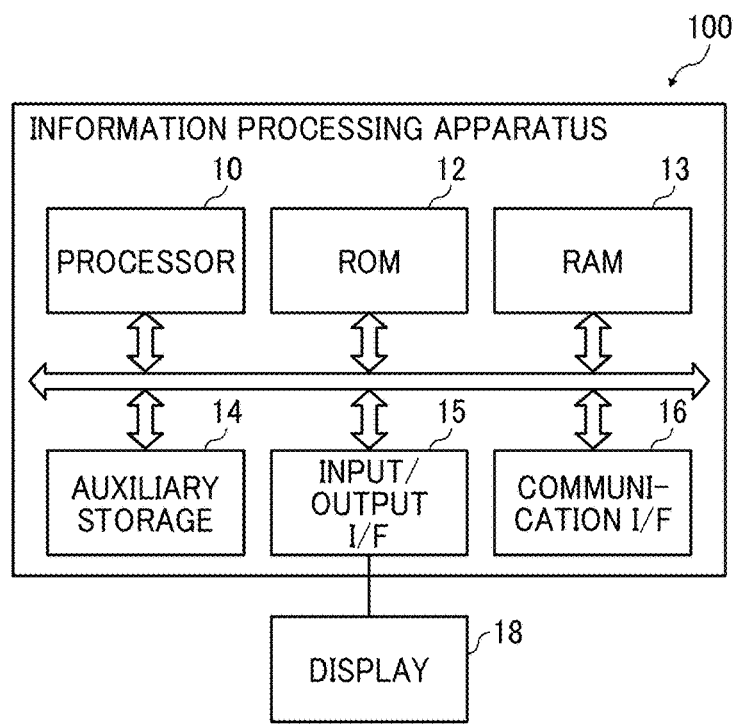
FIG. 2 illustrates an example of a hardware block diagram of the information processing apparatus of a first embodiment.

The image capture system 1000 can be configured as above described. Hereinafter, a description is given of a hardware block diagram of the information processing apparatus 100 of the embodiment with reference to FIG. 2. Each of the three information processing apparatuses 100a to 100c illustrated in FIG. 1 can employ the hardware block diagram illustrated in FIG. 2.

The information processing apparatus 100 includes, for example, a processor 10, a read-only memory (ROM) 12, a random access memory (RAM) 13, an auxiliary storage 14, an input/output interface (I/F) 15, and a communication interface (I/F) 16. The processor 10 controls operations of the information processing apparatus 100 entirely. The ROM 12 stores a boot program and a firmware program and the like. The RAM 13 provides an execution or working space of one or more programs. The auxiliary storage 14 stores one or more programs and an operating system (OS) that are executed to implement each units inside the information processing apparatus 100 to be described later. The input/output I/F 15 is used for connecting with a display 18. The communication I/F 16 is used for establishing communication with the image capture device 110.

The processor 10 reads the programs from the auxiliary storage 14 and executes the programs, and requests an acquisition of a full-view spherical image to the image capture device 110 via the communication I/F 16. Further, under the execution of the programs, the processor 10 acquires the full-view spherical image via the communication I/F 16, saves or stores the acquired full-view spherical image in the RAM 13 or the auxiliary storage 14, displays the acquired full-view spherical image on the display 18, and executes various processing to the full-view spherical image. The details of these processing is described later.

First Embodiment

Figure 3:
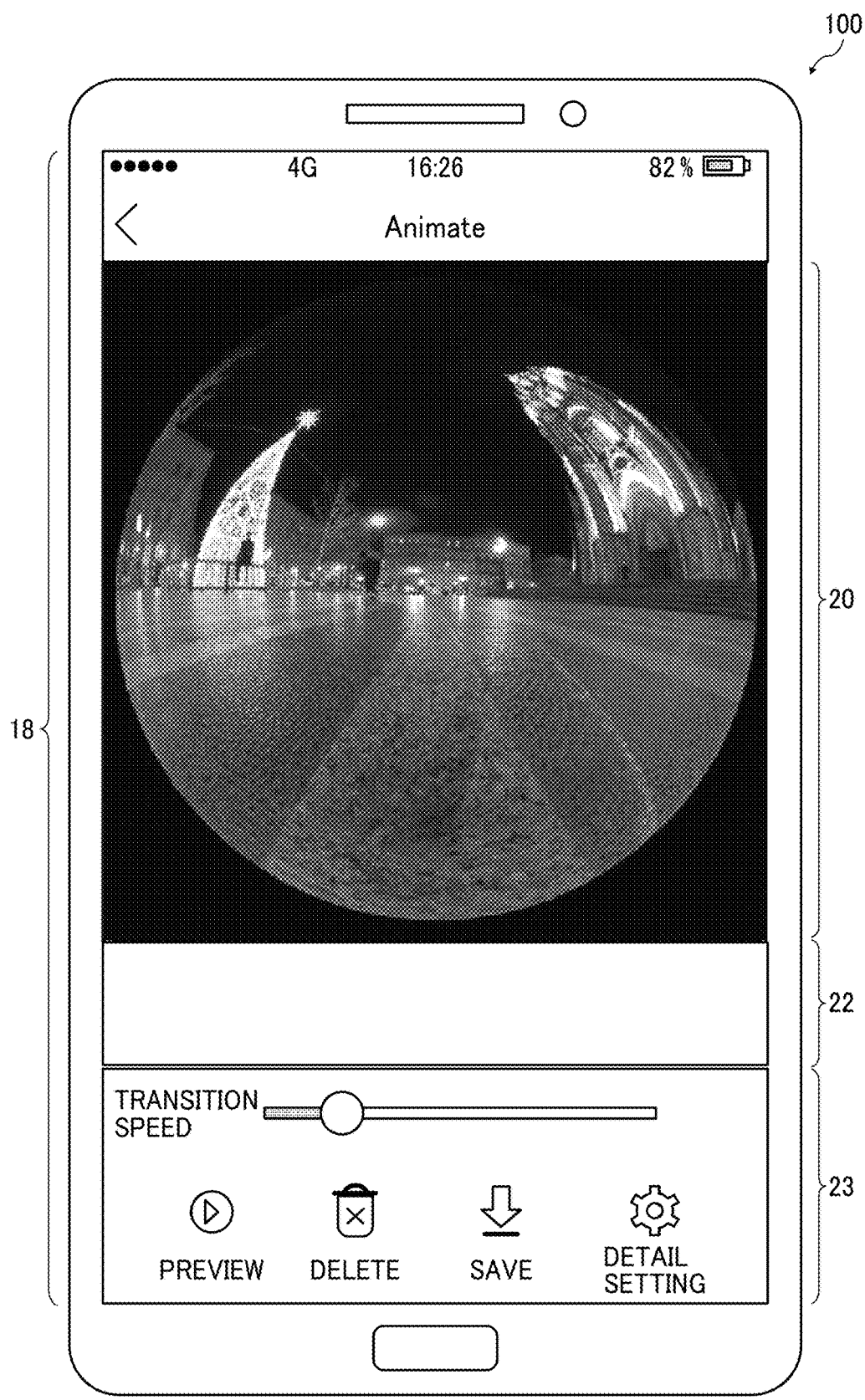
FIG. 3 illustrates an example of an appearance of the information processing apparatus of the first embodiment.

FIG. 3 illustrates an example of an appearance of the information processing apparatus 100 of a first embodiment of the disclosure. The information processing apparatus 100 includes the display 18, and installed with one or more programs used for executing various processing such as one or more application programs (hereinafter, specific application) used for generating an animation sequentially displaying two or more regions included in a full-view spherical image. In an example case illustrated in FIG. 3, the information processing apparatus 100 employs a smartphone, but not limited thereto. For example, the information processing apparatus 100 can be a tablet PC, a notebook PC, or a desktop PC. In the following description, the information processing apparatus 100 employs a smartphone.

As illustrated in FIG. 3, an operation screen of the specific application includes, for example, a section 20, a section 22, and a section 23 on the display 18, in which the operation screen may be also referred to as an application screen or a screen. The section 20 displays a two dimensional image that is generated by performing a projective transformation to a partial region of a full-view spherical image, which corresponds to a three dimensional model. The section 22 displays one or more thumbnail images of one or more registered viewpoints to be described later. Further, the section 23 displays various operation buttons such as a "slider," a "preview" button, a "delete" button, a "save" button, and a "detail setting" button. The slider is used for setting a transition speed to be described later. The "preview" button is used for playing generated movie image data as a preview to be described later. The "delete" button is used for deleting the registered viewpoint to be described later. The "save" button is used to store the generated movie image data to be described later. The detail setting" button is used for setting detail settings to be described later.

Hereinafter, a description is given of a functional configuration of the information processing apparatus 100 with reference to a functional block diagram illustrated in FIG. 4. In the information processing apparatus 100, when the processor 10 executes the above described specific application, functions of the information processing apparatus 100 can be implemented, which means when the information processing apparatus 100 executes the specific application, the information processing apparatus 100 can implement the respective functional units. In the following description, the information processing apparatus 100 can implement the functional units when the specific application is executed, but not limited thereto. For example, a part or all of the functions of the information processing apparatus 100 can be implemented by a hardware such as a dedicated circuit. Further, a part or all of the functions of the information processing apparatus 100 can be implemented by a combination of software and hardware such as a dedicated circuit.

Figure 4:
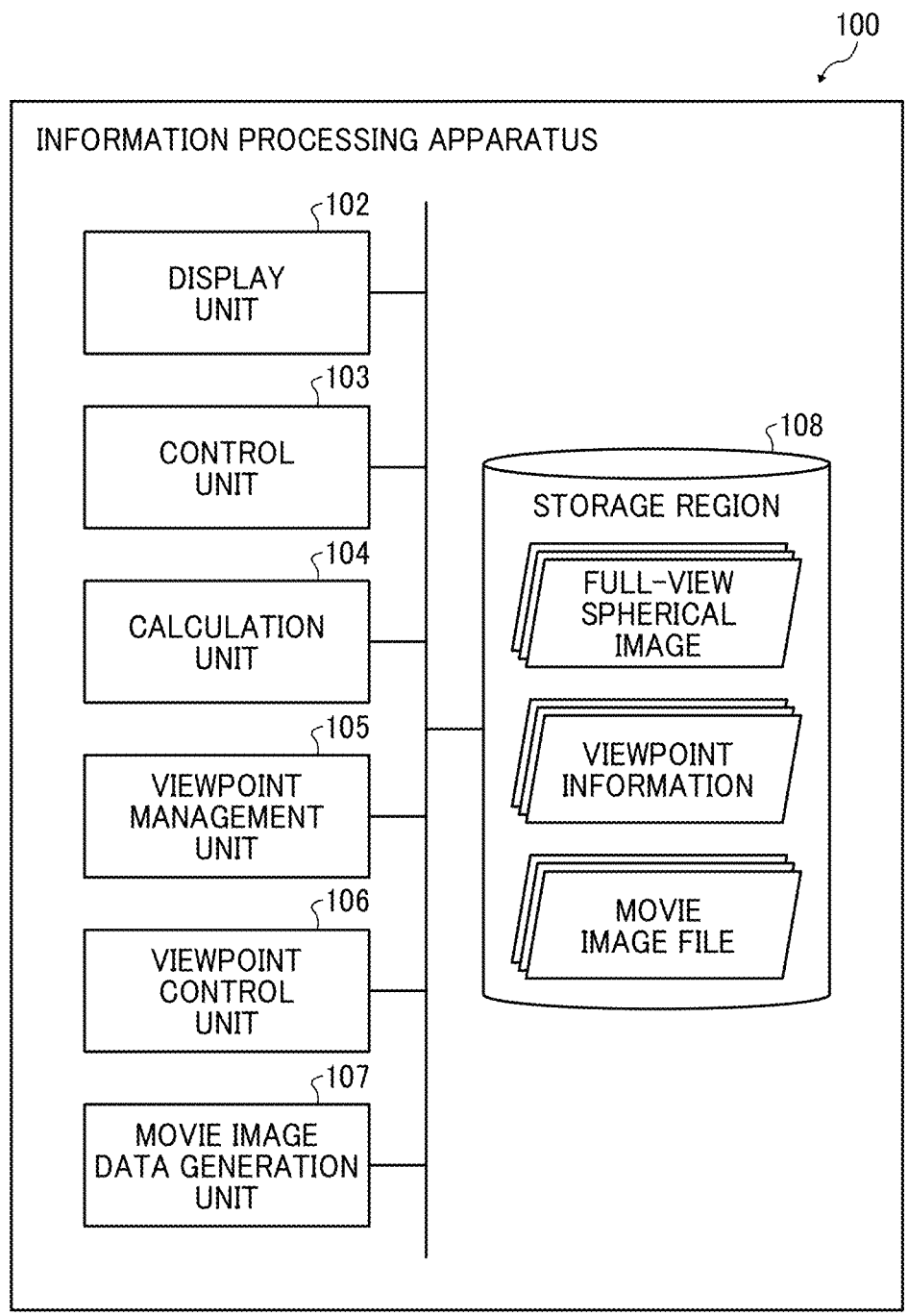
FIG. 4 illustrates an example of a functional block diagram of the information processing apparatus of the first embodiment.

As illustrated in FIG. 4, the information processing apparatus 100 includes, for example, a display unit 102, a control unit 103, a calculation unit 104, a viewpoint management unit 105, a viewpoint control unit 106, a movie image data generation unit 107, and a storage region 108 as functional units. The storage region 108 can be implemented, for example, by the RAM 13 and/or the auxiliary storage 14.

The display unit 102 generates an image to be displayed on the display 18, and displays one or more user interfaces (UIs) on the display 18, in which the one or more UIs are operable by a user.

When a full-view spherical image is mapped to a surface of a given virtual three dimensional object (e.g. inner surface of sphere) as a three dimensional model, the viewpoint management unit 105 registers and manages one or more viewpoints designated by a user with an order designated by the user.

When a first viewpoint and a second viewpoint next to the first viewpoint are specified or designated in the three dimensional model of the full-view spherical image, the viewpoint control unit 106 performs a transition of viewpoints from the first viewpoint to the second viewpoint along a transition path interpolating between the first viewpoint and the second viewpoint.

The calculation unit 104 executes various image processing and geometric calculation, and generates one or more partial images, in which each partial image has the center that matches each of viewpoints transiting along the transition path when the partial images are being displayed on the display 18. In this disclosure, the "partial image" means a two dimensional image obtained by performing the projective transformation to a partial region setting one viewpoint in the three dimensional model of the full-view spherical image as the center of the partial region.

The control unit 103 performs an animation display of a plurality of generated partial images by connecting the plurality of generated partial images in an order of the transitions of the viewpoints.

The movie image data generation unit 107 converts the plurality of generated partial images into movie image data using a general-purpose file format.

The storage region 108 stores various data.

The information processing apparatus 100 can be functionally configured as above described. Hereinafter, a description is given of a use of the specific application of the embodiment.

Figure 5:
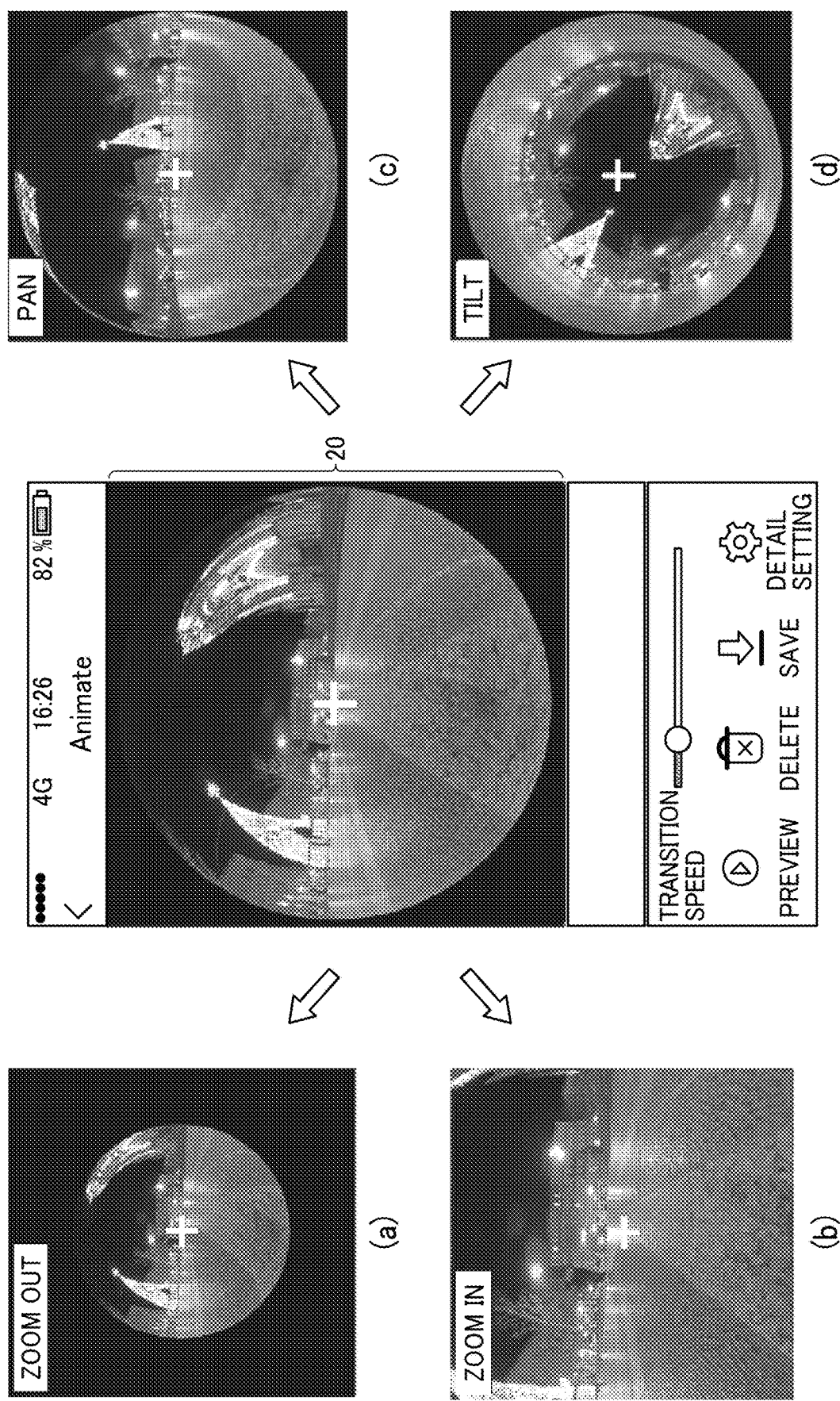
FIG. 5 illustrates examples of partial images.

The display unit 102 of the information processing apparatus 100 displays a partial image generated by the calculation unit 104 on the section 20 of the display 18 (e.g., touch panel) of a smartphone, and the display unit 102 receives a change of viewpoint and a change of an angle of view of a full-view spherical image such as "pan, tilt, zoom in, and zoom out" in response to a change operation performed by a user on the section 20. FIG. 5 including FIGS. 5(a) to 5(d) illustrate examples of partial images displayed on the section 20 in accordance with an operation of a user such as pan, tilt, zoom in, and zoom out operation.

Figure 6:
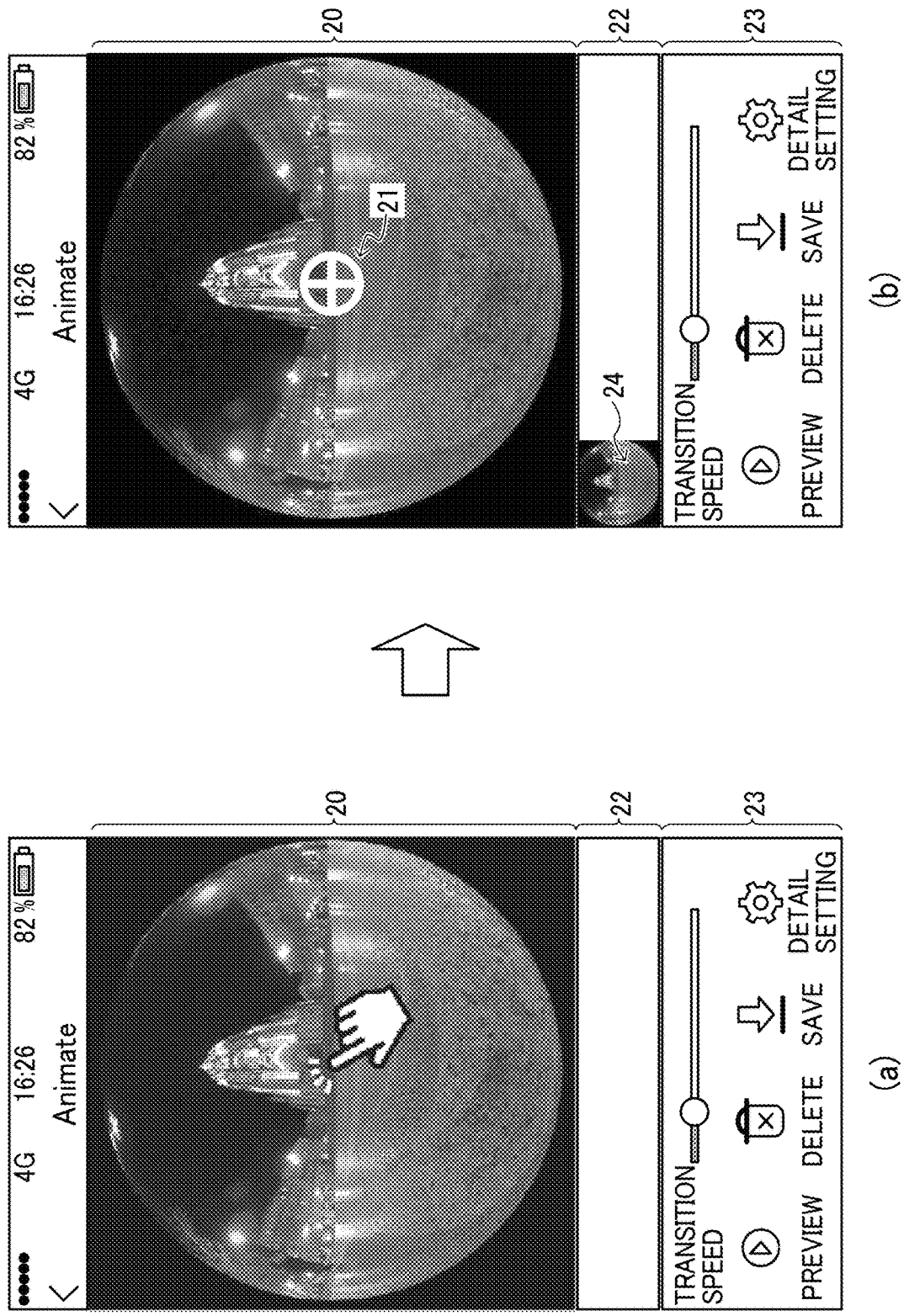
FIG. 6 illustrates an example of an application screen when registering a viewpoint.

When the specific application is used, at first, as illustrated in FIG. 6(a), a user performs an operation such as a long press or double tap to designate or specify a desired position of a partial image displayed on the section 20 as a first viewpoint (hereinafter, also referred to as viewpoint 1). In response to this operation on the section 20, the application screen transits to a state illustrated in FIG. 6(b), in which an icon 21 indicating the registration of the viewpoint 1 is displayed on the section 20 at a position within the partial image designated by the user, and an icon 24 is displayed as a thumbnail image for calling the viewpoint 1.

Figure 7:
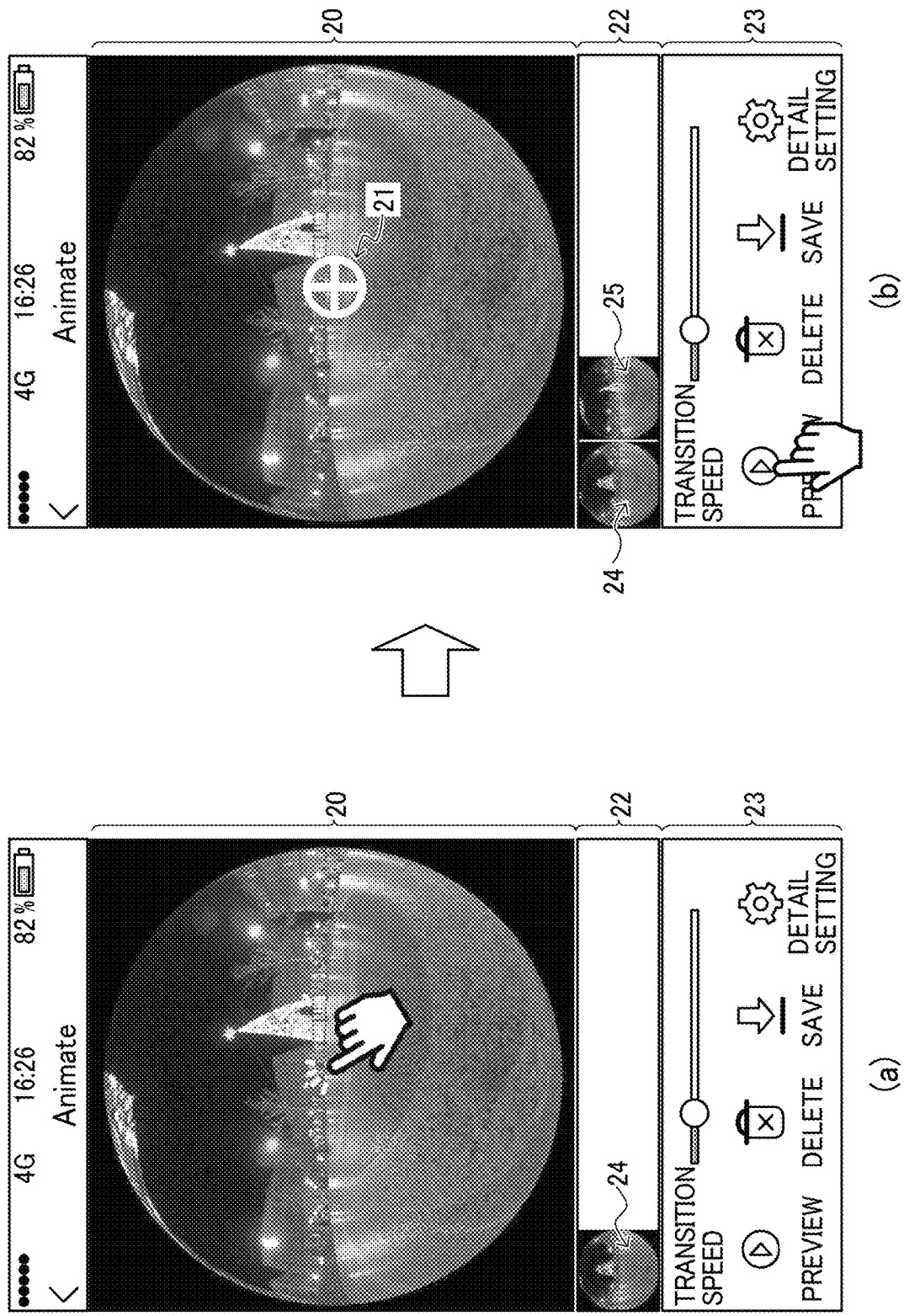
FIG. 7 illustrates another example of an application screen when registering a viewpoint.

Then, the user operates the section 20 to change the viewpoint to display another partial image, and then the user designates a desired position in the partial image as a second viewpoint (hereinafter, also referred to as viewpoint 2) as illustrated in FIG. 7(a). In response to the user operation on the section 20, the application screen transits to a state illustrated in FIG. 7(b), in which an icon 21 indicating the registration of viewpoint 2 is displayed on the section 20 at the position within the partial image designated by the user, and an icon 25 is displayed as a thumbnail image for calling the viewpoint 2, in which the icon 25 is displayed next to the icon 24.

In the embodiment, when the number of registered viewpoints becomes two or more (hereinafter referred to as the registered viewpoint or viewpoints), the two or more registered viewpoints are connected, and played as a preview of an animation.

Figure 8:
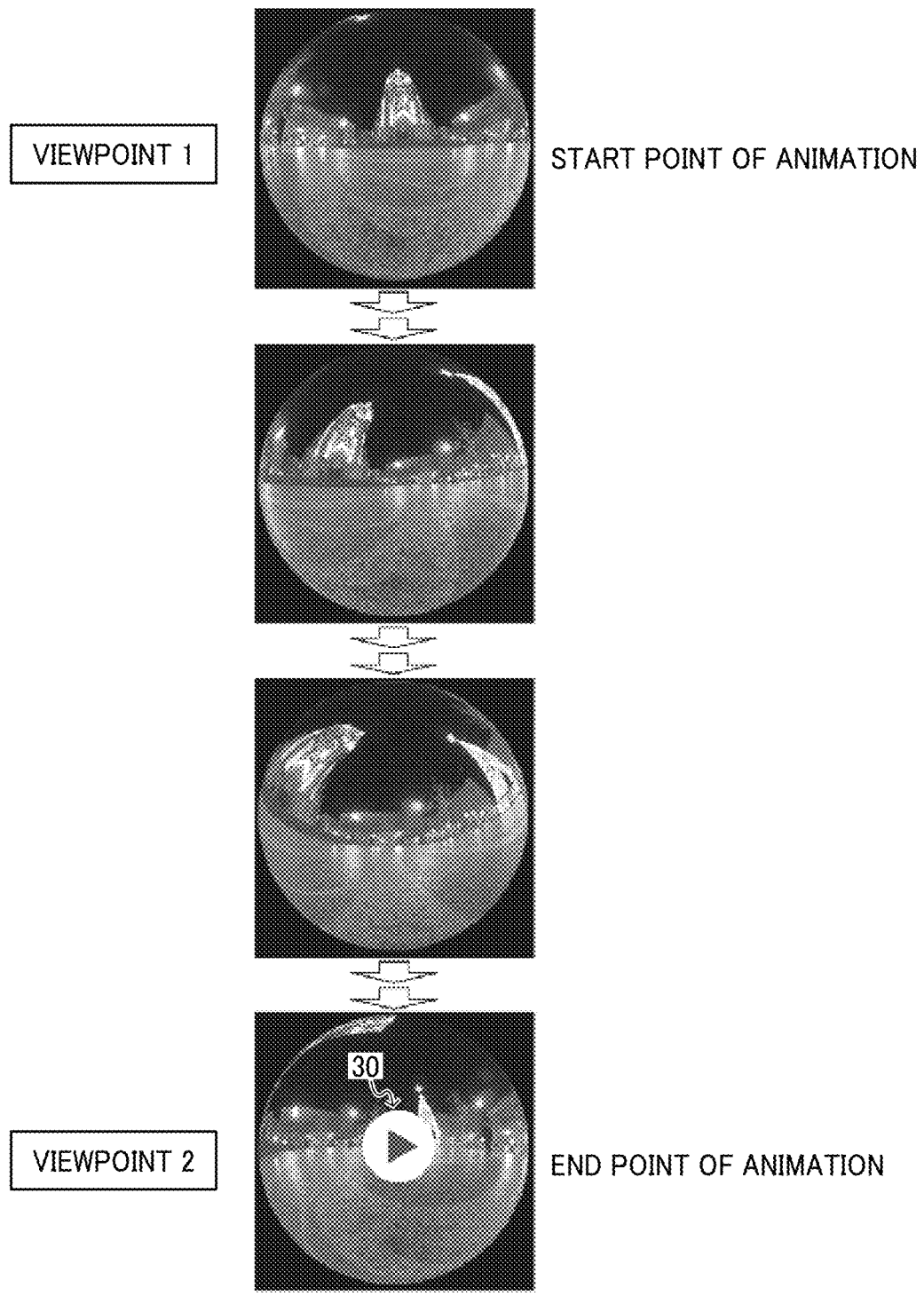
FIG. 8 illustrates an example of an animation during a preview playing.

In the above described example case, when the user selects the "preview" button displayed on the section 23 on the application screen illustrated in FIG. 7(b), an animation illustrated in FIG. 8 is played and displayed on the section 20. The user can check or confirm whether the animation of the full-view spherical image is generated in line with the user intention by using the preview playing function. Further, when the display of the animation is completed up to the viewpoint 2, a play start icon 30 is displayed (FIG. 8). By tapping the play start icon 30, the preview of the animation is executed again.

In the embodiment, the minimum unit of the viewpoint registration is the registration of two viewpoints such as "viewpoint 1" and "viewpoint 2" respectively registered as a start viewpoint and an end viewpoint used for one transition. Then, the number of the registered viewpoints can be increased by assuming the most-recently registered viewpoint (i.e., the most-recently registered end viewpoint) as a new start viewpoint, and registering a new viewpoint as a new end viewpoint. By repeating this procedure, the number of the registered viewpoints can be increased. Further, the information processing apparatus 100 can be configured that the application registers a start point (i.e., viewpoint) of an animation as a default point, in which the minimum unit of the viewpoint registration can be set when the user designates at least one viewpoint.

For example, as illustrated in FIG. 9, four viewpoints such as viewpoint 3, viewpoint 4, viewpoint 5, and viewpoint 6 can be added to the above mentioned two viewpoints such as viewpoint 1 and viewpoint 2. When the viewpoint is to be registered, the angle of view can be changed by performing a zoom-in or zoom-out operation to the partial image displayed on the section 20. When the viewpoints having different angle of views are registered, a performance of zoom-in/zoom-out can be incorporated in the animation.

FIG. 10A(a) illustrates an example of an application screen when the above described six viewpoints 1 to 6 are registered. In this example case, six icons corresponding to the six viewpoints are displayed as six thumbnail images on the section 22.

When three or more viewpoints are registered as illustrated in FIG. 10A(a), a viewpoint other than the registered first viewpoint and the registered end viewpoint can be used as a start viewpoint so that a preview can be played from the viewpoint at an intermediate position of the three or more viewpoints (e.g., viewpoints 2, 3, 4, 5 in FIG. 10A(a)), with which the check time of animation can be reduced.

Further, in the embodiment, each viewpoint can be called from the each icon displayed on the section 22 as the thumbnail image, and then contents of each viewpoint can be edited.

For example, when a user selects an icon of "viewpoint 4" as illustrated in FIG. 10A(b), one partial image currently displayed on the section 20 is switched to another partial image setting the "viewpoint 4" as the center of another partial image. In response to this selection operation, the user can operate another partial image, switched from the one partial image, to edit the contents of the viewpoint 4 as illustrated FIGS. 10A(b) and 10B(c). FIGS. 10A(b) and 10B(c) illustrate an example case that the coordinates of the registered viewpoint is changed, but not limited thereto. For example, when the viewpoint is called by performing the above procedure, other parameter associated with the viewpoint can be edited.

Further, when a user selects one icon corresponding to one viewpoint, and then selects the "delete" button displayed on the section 23, the selected one viewpoint can be deleted. Further, when a user selects one icon corresponding one viewpoint, the user can change a "transition speed," to be described later, by using a slider displayed on the section 23.

Figure 11B:
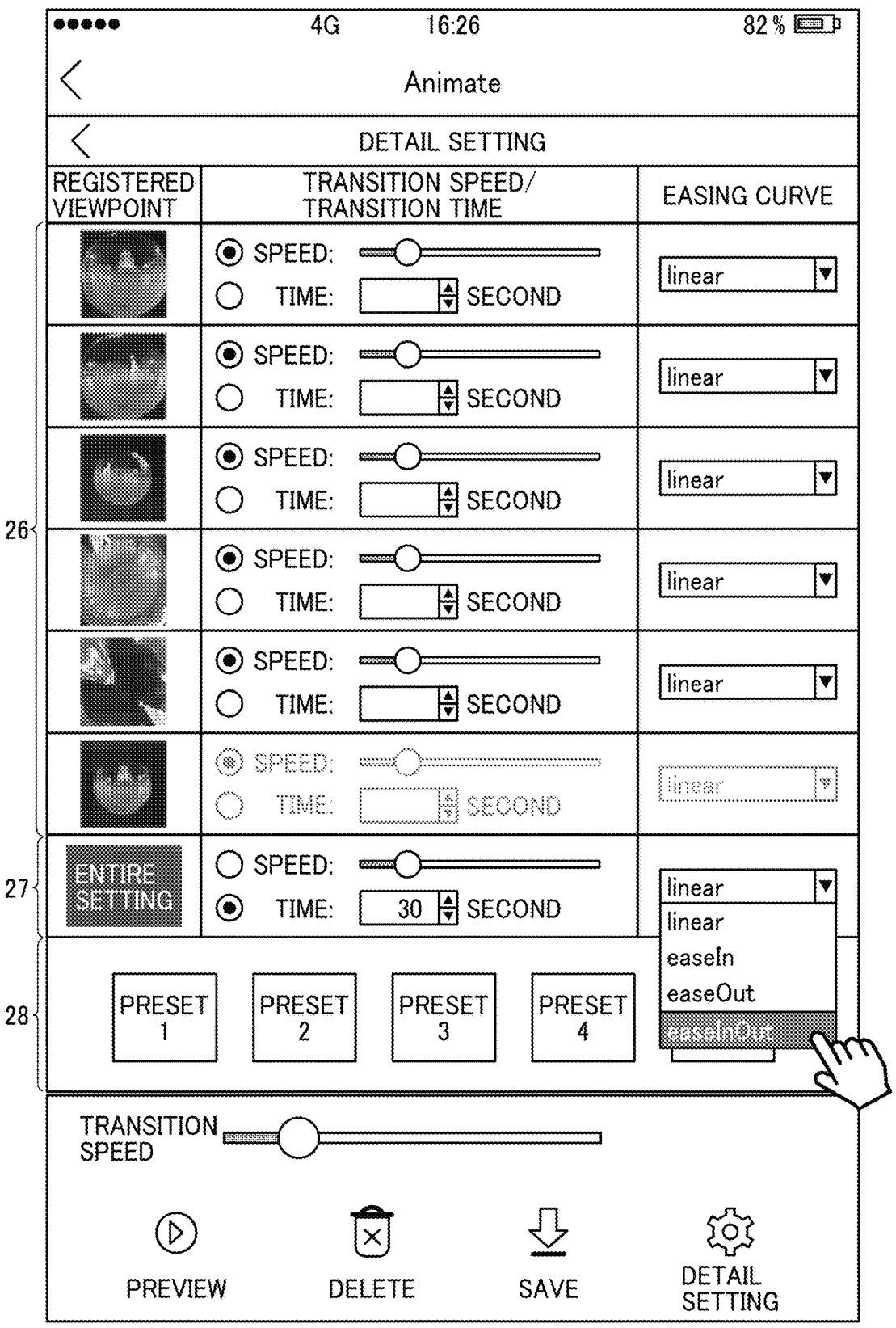

Further, in the embodiment, as illustrated in FIG. 11A(a), when a user selects the "detail setting" button displayed on the section 23, the application screen transits to a detail setting screen illustrated in FIG. 11B(b). As illustrated in FIG. 11B(b), the detail setting screen includes, for example, a section 26, a section 27, and a section 28.

A slider for setting the transition speed, and a numerical input box for setting the transition time are associated with each registered viewpoint on the section 26, in which the transition speed and the transition time are alternatively selected by using radio buttons. With this configuration, a user can adjust a transition pattern of the viewpoints by adjusting the transition speed and/or the transition time.

In this disclosure, the "transition speed" means a speed of transition of the viewpoints from the first viewpoint to the second viewpoint along a transition path interpolating between the first viewpoint and the second viewpoint when the first viewpoint and the second viewpoint, next to the first viewpoint, are designated or specified in the three dimensional model of the full-view spherical image. The "transition time" means the time required for the transition from the first viewpoint to the second viewpoint.

Further, a pull-down menu for selecting an easing curve is associated with each registered viewpoint on the section 26 as illustrated in FIG. 11B(b). With this configuration, a user can change the transition pattern of the viewpoints by using the easing curve. In this disclosure, the easing curve means a curve indicating a speed change of an animation over the time. When "linear" is set, the transition of viewpoints occurs at a constant speed, when "easeIn" is set, the transition of viewpoints occurs at a slow speed at first, gradually accelerated, and then at a constant speed, when "easeOut" is set, the transition of viewpoints occurs at a fast speed at first, gradually decelerated, and then at a constant speed, and when "easeInOut" is set, performances of "easeIn" and "easeOut" are combined.

In this disclosure, each of the above described parameters may be referred to as a "viewpoint parameter." In the embodiment, each viewpoint parameter can be selectively set to each viewpoint, with which an animation can be displayed with various patterns such as a dynamic pattern having various changing pattern in the animation playing.

Further, the section 27 displays an icon for selecting "entire setting." The "entire setting" icon is associated with a slider for setting the transition speed, the numerical input box for setting the transition time, and the pull-down menu for selecting the easing curve. When the "entire setting" icon is selected, the above described each of the parameters is applied to the entire viewpoints such as the first viewpoint to the end viewpoint (i.e., last viewpoint), with which feeling of unity can be set for an animation, and natural movement can be performed for the animation. For example, the "entire setting" is suitable when to display the animation while continuously rotating in the same direction.

Further, the section 28 displays icons for selecting a preset of the viewpoint parameter such as preset 1 to preset 5. In this disclosure, one or more sets of viewpoint parameters and representative transition pattern (e.g., transition path) of viewpoints can be prepared as preset data, and the preset data can be stored in the storage region 108 in advance. When a user selects an icon displayed on the section 28, preset data corresponding to the selected icon is read out from the storage region 108, and the preset data is applied to a full-view spherical image read out from a memory by a user operation, with which the animation display is performed automatically. Also in this case, the icon used for calling the viewpoint is displayed on the section 22 as the thumbnail image. In this example case, the user can use the animation that is automatically performed in accordance with the preset data, or the user can customize the animation by editing any of the viewpoints displayed on the section 22. Further, in another embodiment, a set of viewpoint parameters corresponding to the animation display prepared by the user can be stored in the storage region 108 as preset data so that the viewpoint parameters can be used again.

Further, in the embodiment, when a user selects the "save" button displayed on the section 23, as illustrated in FIG. 12A(a), the application screen transits to a state illustrated in FIG. 12A(b). During this period, the animation generated by applying the display method using the above described procedure is cropped with a size of the screen, converted into movie image data using a general-purpose file format such as Moving Picture Experts Group (MPEG) or Audio Video Interleaved (AVI), and then saved or stored in the storage region 108. Further, in another embodiment, the animation can be cropped at any crop region other than the size of the screen, or any background audio can be synthesized with the animation.

When the animation is converted into the movie image data using the general-purpose file format as above described, the movie image data can be played simply by using a standard movie image play application without using a dedicated viewer of the full-view spherical image. FIG. 12B(c) illustrates an example case that the movie image data is played by using the standard movie image play application. Therefore, in the embodiment, the partial images having different viewpoints are generated from the full-view spherical image, converted to the movie image data using the general-purpose image file format, and the converted movie image data is played while transiting the viewpoints from one viewpoint to the next viewpoint. The movie image data using the general-purpose image file format can be posted on a movie image posting site, or can be shared with others on social networking service (SNS).

The specific application of the embodiment can be used as above described. Hereinafter, a description is given of processing executed by each unit of the information processing apparatus 100 (see FIG. 4). Hereinafter, a description is given of processing of the information processing apparatus 100 that is executed when registering the viewpoint with reference to a sequence diagram illustrated in FIG. 13.

At first, a user performs a registration operation of a viewpoint (S1) by performing the above described procedure. In response to the viewpoint registration operation at S1, the display unit 102 reads and acquires the following viewpoint parameters (1) and (2) (S2).

(1) currently set transition speed or transition time
(2) currently set easing curve Then, the display unit 102 reports the control unit 103 that the viewpoint registration is requested from the user by using the parameters acquired at S2 as argument (S3).

In response to this report, the control unit 103 instructs the calculation unit 104 to calculate spherical coordinates (θ, φ) of the viewpoint corresponding to image coordinates (x, y) of the viewpoint designated or specified by the user, and acquires a calculation result from the calculation unit 104 (S4). Then, the control unit 103 instructs the calculation unit 104 to calculate a current display magnification such as zoom magnification with respect to an initial angle of view, and acquires a calculation result from the calculation unit 104 (S5). Hereinafter, the spherical coordinates (θ, φ) of the viewpoint is also referred to as the viewpoint coordinates.

Then, the control unit 103 reports the parameters (1) and (2) acquired from the display unit 102, and the spherical coordinates (θ, φ) of the viewpoint and the display magnification acquired from the calculation unit 104 to the viewpoint management unit 105, and requests a registration of a new viewpoint (S6).

In response to this request, the viewpoint management unit 105 newly generates a viewpoint information management table 500 illustrated in FIG. 14A, and registers each value reported from the control unit 103 in the viewpoint information management table 500. As illustrated in FIG. 14A, the viewpoint information management table 500 includes fields 501 to 507. The field 501 stores an index of the registered viewpoint. The field 502 stores a horizontal angle (θ) of the registered viewpoint. The field 503 stores an elevation angle (φ) of the registered viewpoint. The field 504 stores the display magnification. The field 505 stores the transition speed. The field 506 stores the transition time. The field 507 stores the easing curve. The viewpoint management unit 105 stores each value (hereinafter, referred to as viewpoint information) reported from the control unit 103 at S6 in the respective fields in the viewpoint information management table 500.

In response to the completion of registration of the viewpoint, the control unit 103 returns an icon of a thumbnail image corresponding to the registered viewpoint to the display unit 102 (S7).

Then, the display unit 102 displays the icon of thumbnail image on the section 22 (S8) to inform the user that the viewpoint registration is completed.

Each time the user performs the above described viewpoint registration processing, S1 to S8 are repeatedly executed, and the viewpoint designated or specified by the user is registered in the viewpoint information management table 500 with the order designated or specified by the use.

FIG. 14B illustrates an example of the viewpoint information management table 500 after six viewpoints is registered. In this processing, the most-recently registered viewpoint (e.g., viewpoint 6) becomes the most-recently registered end viewpoint, and the fields 505 to 507 corresponding to the most-recently registered end viewpoint stores "NONE" to indicate that there is no value in the fields 505 to 507. In this disclosure, the viewpoint information management table 500 is stored in the storage region 108 by associating the viewpoint information management table 500 as meta data of the full-view spherical image.

Further, in response to the above described editing operation of the viewpoint, the values of respective fields in the viewpoint information management table 500 are updated. Further, in addition to using the viewpoint information management table 500 as the meta data of the full-view spherical image, the contents of the viewpoint information management table 500 alone can be registered as preset data. Further, the viewpoint information management table 500 can be output to an external database by associating with the full-view spherical image, or the viewpoint information management table 500 alone can be output to the external database.

The information processing apparatus 100 performs the viewpoint registration as described above. Hereinafter, a description is given of processing of the information processing apparatus 100 when executing the preview playing with reference to a sequence diagram illustrated in FIG. 15.

At first, when a user operates the preview playing based on the above described procedure (S1A), in response to this operation, the display unit 102 reports the control unit 103 that the playing of animation is requested from the user (S2A).

In response to this report, the control unit 103 requests the viewpoint information associated with a full-view spherical image to the viewpoint management unit 105, and acquires a set of viewpoint information associated with the full-view spherical image, stored in the viewpoint information management table 500 stored in the storage region 108, from the viewpoint management unit 105 (S3A).

Then, the control unit 103 requests the start of controlling the animation to the viewpoint control unit 106 by using the set of viewpoint information of the registered first viewpoint (i.e., start viewpoint) and the registered second viewpoint (i.e., end viewpoint) as the argument (S4A).

In response to this request, the viewpoint control unit 106 performs a control of transition of the viewpoints from the registered first viewpoint (i.e., start viewpoint) to the registered second viewpoint (i.e., end viewpoint) along a transition path interpolated between the registered first viewpoint (i.e., start viewpoint) and the registered second viewpoint (i.e., end viewpoint).

Specifically, the viewpoint control unit 106 calculates a shift value of the viewpoint for each frame (i.e., each partial image configuring one animation) based on the distance between the registered two viewpoints such as the registered first viewpoint (i.e., start viewpoint) and the registered second viewpoint (i.e., end viewpoint), the transition speed or the transition time set for transiting from the registered first viewpoint (i.e., start viewpoint) to the registered second viewpoint (i.e., end viewpoint), in which the transition speed and the transition time are the viewpoint parameters set for the registered first viewpoint (S5A). At S5A, the viewpoint control unit 106 calculates the shift value of the viewpoint under an assumption that the viewpoints transit from the registered first viewpoint (i.e., start viewpoint) to the registered second viewpoint (i.e., end viewpoint) by interpolating the shortest distance between the registered first viewpoint (i.e., start viewpoint) and the registered second viewpoint (i.e., end viewpoint).

After completing the calculation of the shift value of the viewpoint for each frame, the viewpoint control unit 106 reports the start of the animation to the control unit 103 (S6A).

Then, the viewpoint control unit 106 repeatedly reports the shift value of the viewpoint for each frame to the control unit 103 until a value obtained by multiplying a frame period to the number of frames exceeds the transition time (S7A).

When the control unit 103 receives the report of the shift value of the viewpoint from the viewpoint control unit 106, the control unit 103 requests the calculation unit 104 to calculate a shift of viewpoint, and acquires a partial image setting the shift-calculated viewpoint as the center of the partial image as a calculation result (S9A).

In response to this acquiring, the control unit 103 transmits the partial image acquired at S9A to the display unit 102, and requests display unit 102 to update the displaying of the partial image (S10A).

By contrast, when the value obtained by multiplying the frame period to the number of frames exceeds the transition time, the viewpoint control unit 106 reports to the control unit 103 that the animation starting from the registered first viewpoint (i.e., start viewpoint) to the registered second viewpoint (i.e., end viewpoint) is completed (S8A), and the sequence proceeds to the next processing such as post-processing. The processing from S4A to S10A is repeatedly executed for the number of registered viewpoints configuring one animation that is from the start viewpoint to the end viewpoint, and when the number of animation count has reached the total number of the registered viewpoints, the control unit 103 reports to the display unit 102 that the animation is completed (S11A).

By performing the above described procedure, the control unit 103 executes the animation of a plurality of the partial images generated by the calculation unit 104 and connected with an order of the transition of the viewpoints.

In this configuration, in addition to the interpolation between the viewpoints, it is preferable that the angle of view is interpolated between the registered two viewpoints when performing the transition of viewpoints. In this case, the viewpoint control unit 106 calculates a shift value of the angle of view for each frame based on a difference of the display magnification between the registered two viewpoints such as the adjacent viewpoints, and the calculation unit 104 generates one or more partial images having the angle of view changed for each frame based on the calculated shift value of the angle of view. With this configuration, a smooth zoom-in and/or zoom-out expression can be performed when playing the animation.

Further, the movie image data generation unit 107 converts the plurality of partial images generated by the calculation unit 104 into movie image data using a general-purpose file format such as Moving Picture Experts Group (MPEG) or Audio Video Interleaved (AVI), and stores the movie image data in the storage region 108.

As described above, in this disclosure, a concerned portion or region in the full-view spherical image can be easily presented as a movie image without causing longer time and greater load for searching and selecting the viewpoints by a user.

The first embodiment has the above described features. Hereinafter, a description is given of a second embodiment of the disclosure. In the following description, the description of portions in common with the first embodiment are omitted, and differences from the first embodiment are described.

Second Embodiment

In the above described first embodiment, it is assumed that the viewpoints shift from the registered first viewpoint (i.e., start viewpoint) to the registered second viewpoint (i.e., end viewpoint) by interpolating the shortest distance between the registered first viewpoint (i.e., start viewpoint) and the registered second viewpoint (i.e., end viewpoint), and the viewpoint control unit 106 calculates the shift value of viewpoint. In the second embodiment, a user can set a viewpoint transition direction as a viewpoint parameter, which is different from the first embodiment.

In the second embodiment, as illustrated in FIG. 16A(a), when a user designates a viewpoint in a partial image displayed on the section 20, an application screen transits to a state illustrated in FIG. 16A(b), and an icon 29 indicating the registration completion of the viewpoint is displayed in the partial image.

Figure 16:
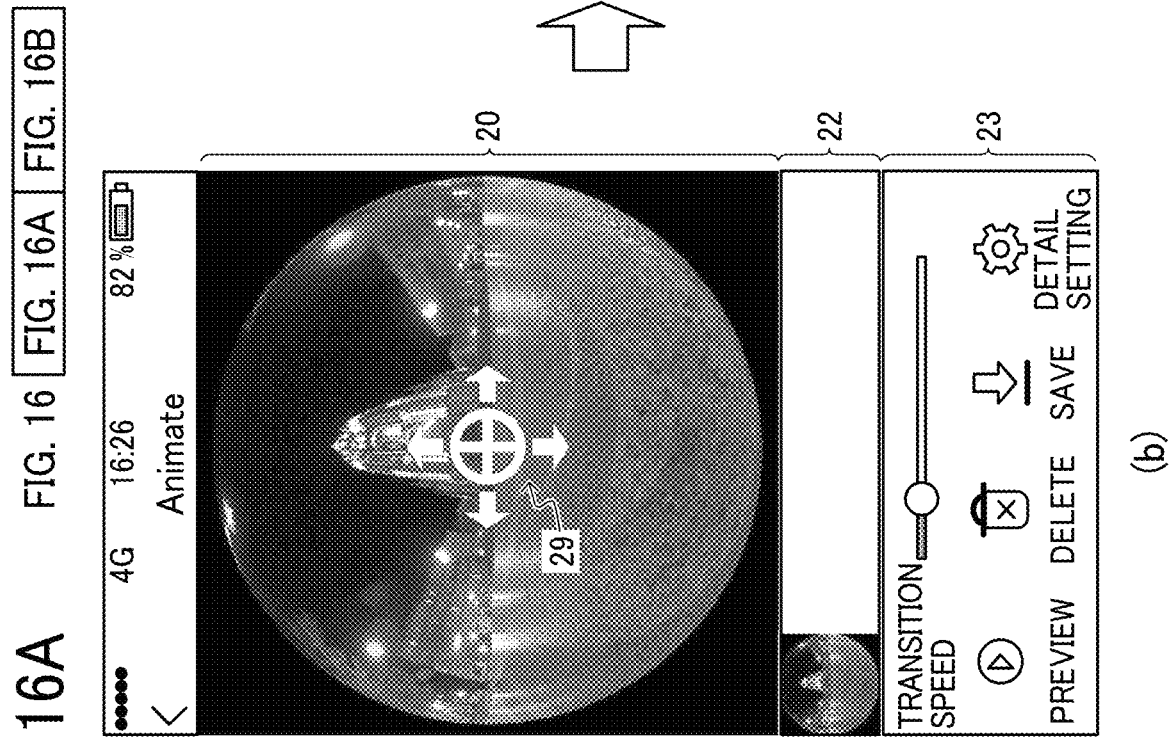
FIGS. 16A and 16B illustrate an example of an application screen when registering a viewpoint in a second embodiment.

The icon 29 includes a direction instruction button having four arrows for specifying the vertical direction (i.e., tilt direction) and the lateral direction (i.e., pan direction) of the partial image. As illustrated in FIG. 16B(c), in response to a selection of any one of the four arrows of the direction instruction button by the user, a transition direction to the next to-be-registered viewpoint is set. In an example case of FIG. 16, the direction instruction button has four arrows for specifying or instructing four directions such as up, down, left, and right, but the direction instruction button can be set with eight directions to set the transition direction more finely. Further, when the second and succeeding viewpoint are to be registered, the direction instruction button can be configured to display an arrow forwarding or directing to the second and succeeding viewpoint to be registered, in which the transition direction from the most-recently registered viewpoint toward the next to-be-registered viewpoint can be specified.

FIGS. 17A to 17D illustrate examples of relationships between a selection of the direction instruction button in the icon 29 and a transition direction from the registered first viewpoint to the registered second viewpoint. In the second embodiment, the transition direction is designated when the viewpoints are registered. Therefore, as illustrated in FIGS. 17A to 17D, a transition path of the viewpoints can be set with various patterns such as the shortest route and the detour, with which the animation can be performed with various patterns.

In the second embodiment, when the transition direction is set while registering the viewpoint, the transition direction is registered in the viewpoint information management table as one of the viewpoint parameters. FIG. 14C illustrates a viewpoint information management table 550 generated in the second embodiment. As illustrated in FIG. 14C, the viewpoint information management table 550 further includes a field 508 that stores the transition direction in addition to the above described fields 501 to 507.

The second embodiment is described as above. Hereinafter, a description is given of a third embodiment of the disclosure. In the following description, the description of portions in common with the previous embodiments are omitted, and only the differences may be described.

Third Embodiment

In the above described embodiments, (1) automatic execution of animation using preset data, (2) crop of animation, and (3) synthesis of animation and background audio are schematically described. In the third embodiment, (1) to (3) will be described in detail with reference to other example cases.

Figure 18:
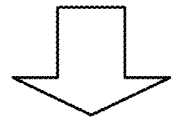
FIG. 18 illustrates examples of preset data.

FIG. 18(a) illustrates an example of a preset data 600 of the third embodiment. The preset data 600 registers two or more viewpoints in a full-view spherical image with a given order, and the preset data 600 is used as data for generating an animation, in which the preset data 600 is used similar to the viewpoint information management table 500 (see FIG. 14). In the third embodiment, it is assumed that one or more of the preset data 600 are stored in the storage region 108.

As illustrated in FIG. 18(a), the preset data 600 includes, for example, fields 601 to 604. The field 601 stores an index of the registered viewpoint. The field 602 stores a horizontal angle (θ) of the registered viewpoint. The field 603 stores an elevation angle (φ) of the registered viewpoint. The field 604 stores display magnification such as a zoom magnification with respect to the initial angle of view. In the third embodiment, when the preset data 600 is used, the same "transition speed" and "easing curve" are applied for the entire viewpoints similar to the above described "entire setting." Therefore, the "transition speed" and "easing curve" are not registered in the preset data 600.

Further, in the third embodiment, it is assumed that one or more crop regions are stored in the storage region 108. The crop region is a rectangular frame used for defining a region where the animation image is cropped, and in the third embodiment, a rectangular frame having a given aspect ratio can be registered as the crop region.

Further, in the third embodiment, it is assumed that one or more background audio are stored in the storage region 108. The background audio means any type of audio data, and in the third embodiment, audio data desired for a user can be registered as the background audio.

FIG. 19(a) illustrates an example of an application screen in the third embodiment. As illustrated in FIG. 19(a), in the third embodiment, the section 23 of the application screen displays a "preset" button for calling the preset data. When a user selects the "preset" button displayed on the section 23, the application screen transits to a preset-use screen illustrated in FIG. 19(b).

As illustrated in FIG. 19(b), the preset-use screen includes, for example, a section 40, a section 42, a section 43, and a section 44. In the third embodiment, a partial image of a full-view spherical image is displayed on the section 40. Further, the section 43 displays, for example, a "preset" button for calling the preset data 600, a "sound" button for calling background audio, a "crop" button for calling a crop region, and a "transition speed" button for setting a transition speed. Further, the section 44 displays, for example, a "preview" button for requesting preview playing, and a "save" button for storing the generated movie image data. Further, the section 42 displays one or more UIs corresponding to each button displayed on the section 43.

For example, in the third embodiment, when a user selects the "preset" button displayed on the section 23 (FIG. 19(a)), as illustrated in FIG. 20A(a), one or more icons corresponding to the preset data 600 stored in the storage region 108 are displayed on the section 42 as selectable options or selections. When the user selects any of the icons in response to displaying of the one or more icons on the section 42, the preset data 600 corresponding to the selected icon is read out from the storage region 108, and set in a temporal storage such as a memory. In an example case illustrated in FIG. 20A(a), each icon displays a schematic image of contents set in the preset data 600.

Further, when the user selects the "sound" button displayed on the section 43, as illustrated in FIG. 20A(b), one or more icons corresponding to the background audio stored in the storage region 108 are displayed on the section 42 as selectable options or selections. When the user selects any of the icons displayed on the section 42, audio data corresponding to the selected icon is read out from the storage region 108, and set as the background audio. Further, when the user does not select the background audio, a default value such as silence or sound mute is set.

Further, when the user selects the "transition speed" button displayed on the section 43, as illustrated in FIG. 20B(c), a slider for setting the transition speed is displayed on the section 42. When the user operates the slider of the transition speed to designate the transition speed, the designated transition speed is set as the transition speed of the viewpoints when generating an animation. Further, when the user does not designate the transition speed, a default value or a given transition speed is set. Further, the easing curve is set with, for example, a default value (e.g. linear).

Further, when the user selects the "crop" button displayed on the section 43, as illustrated in FIG. 21A(a), one or more icons corresponding to the crop regions stored in the storage region 108 are displayed on the section 42 as selectable options or selections. When the user selects any of the icons in response to displaying of the one or more icons on the section 42, a rectangular frame pattern corresponding to the selected icon is read out from the storage region 108, and set as the crop region.

For example, when the user selects "2:1" as the crop region, the animation is cropped as illustrated in FIG. 21A(b). Further, when the user selects "free" as the crop region, as illustrated in FIG. 21B(c), a rectangular frame 45 is displayed on the section 40. In this case, a size of the frame 45 can be variably changed, in which the crop region can be freely set by a user by manually changing the size of the frame 45. Further, when the user does not select the crop region, a default value (e.g., size of screen) is set.

In the third embodiment, the user can variously change and set the above described each value (e.g., preset data, background audio, transition speed, crop region), and the preview can be played each time the value is changed and set.

For example, as illustrated in FIG. 22A(a), when a user selects an icon Q displayed on the section 42, and then selects the "preview" button, the control unit 103 acquires the preset data 600 corresponding to the icon Q from the storage region 108 via the viewpoint management unit 105. Then, based on a set of the viewpoints and the display magnification (angle of view) stored in the acquired preset data 600, the control unit 103, the viewpoint control unit 106, the calculation unit 104, and the display unit 102 cooperate to execute the preview playing to display the animation. The contents of processing to be executed at the time of preview playing is stored in the preset data 600 instead of the above described viewpoint information management table 500. Since the viewpoint information management table 500 described with reference to FIG. 15 and the preset data 600 are substantially the same, a detailed description is omitted.

FIG. 22A(b) illustrates an example of an application screen when the preview playing is completed. When the preview playing is completed, an end frame image of the animation is displayed with a stopped state on the section 40. When the animation is uploaded to a video sharing site or SNS, viewers see the end frame image of the animation, and evaluate the animation based on the end frame image, in which impression of the end frame image of the animation may determine the evaluation of the animation by the viewers. Further, it is not rare that the end frame image is used as a thumbnail image of the animation uploaded to an open site on the network.

When the preset data 600 is used, the end frame image of the animation is determined by one viewpoint and the angle of view of the one viewpoint registered as the end viewpoint in the preset data 600. However, the contents of the end frame image corresponding to the registered end viewpoint may be determined without consideration of image impression, in which the contents of the end frame image may not express impression matched to an intention of a person or an entity that creates the animation. For example, when an animation as a whole is a very interesting one, but the end frame image happens to be an image having poor characteristics, there is a possibility that viewers feel negative impression, and further, if the image having poor characteristics is used as a thumbnail image, viewer's attention may not be attracted.

In view of this issue, in the third embodiment, as illustrated in FIG. 22A(b), an end frame adjustment button 50 is displayed on the section 40 when the preview playing is ended. When a user selects the end frame adjustment button 50, the user can change the end frame image of the animation to the end frame image matched to contents desired for a user.

When the user selects the end frame adjustment button 50, the display unit 102 transits a state of the section 40 to a state that can receive a screen operation by the user (e.g., pan, tilt, zoom in, zoom out) to receive a change operation of the end viewpoint and the angle of view associated with the end viewpoint registered in the preset data 600.

As illustrated in FIG. 22B(c), when the user designates a new viewpoint and a new angle of view by performing an operation on the section 40 in response to the selection of the end frame adjustment button 50, the control unit 103 replaces or updates the end viewpoint and the angle of view associated with the end viewpoint registered in the preset data 600, which is currently stored in the temporal storage, to the new viewpoint and the new angle of view newly designated by the user.

FIG. 18(b) illustrates an example case that a value of coordinates and a display magnification (i.e., angle of view) of the viewpoint 6 registered in the preset data 600 as the end viewpoint are replaced or updated. At this timing, an icon 21 indicating the registration completion of a new viewpoint is displayed on the section 40 as illustrated in FIG. 22B(c). The processing that is performed when the user selects the end frame adjustment button 50 is substantially the same processing that is executed when selecting the icon of the viewpoint and then editing the contents of the viewpoint in the previous embodiment (see FIG. 10), and thereby a detailed description thereof is omitted.

When the user selects the "preview" button at this timing, the animation is generated based on the updated preset data 600. In this case, the viewpoint control unit 106 transits the viewpoints along a modified transition path interpolated based on the changed end viewpoint, the calculation unit 104 generates a plurality of partial images based on the viewpoints transiting along the modified transition path and the changed angle of view of the end viewpoint, and the control unit 103 connects the plurality of partial images generated in this way as an animation, and display the animation on the section 40. At this timing, the control unit 103 crops the animation based on the crop region that is currently set. If the background audio has been set currently, the background audio is played by synchronized with the playing of animation.

Further, when the user selects the "save" button at this timing, the movie image data generation unit 107 converts the plurality of partial images, generated by a procedure similar to the above described procedure, to movie image data using a general-purpose motion picture file format, and stores the movie image data in the storage region 108. At this timing, the movie image data generation unit 107 crops the animation based on the crop region that is currently set, and if the background audio has been set currently, the movie image data generation unit 107 synthesizes the background audio with the movie image data.

As to the above described third embodiment, the movie image data that presents a concerned portion of a full-view spherical image can be generated by using the preset data prepared in advance. As to the third embodiment, even when the preset data is used, the end frame image of the movie image data can be matched to a user interest or intension.

The third embodiment is described as above. Hereinafter, a description is given of a fourth embodiment of the disclosure. In the following description, the description of portions in common with the previous embodiments are omitted, and only differences is described.

Fourth Embodiment

In the above described first to the third embodiments, images can be displayed with various patterns by changing the parameters such as the viewpoint and the angle of view of the viewpoint in the full-view spherical image. However, the parameters are not limited to thereto, but other parameters can be adjusted. For example, when a projection method, type or mode is changed between the viewpoints, an image can be displayed dynamically.

The projection type is a method of expressing a full-view spherical image mapped on a surface of a virtual three dimensional object (e.g. inner face of sphere) onto a two dimensional plane, and is similar to a map projection method. Before describing the projection type, the parameters for changing the image expression is described.

A full-view spherical image is mapped on the surface of a virtual three dimensional object. FIG. 23 illustrates a sphere 200 expressed on a two dimensional plane represented by the Y axis and the Z axis, which are two of the three axes of a three dimensional space represented by the three axes of the X axis, the Y axis, and the Z axis. The Y axis is used as the height direction (vertical direction), and the Z axis is used as the horizontal direction parallel to a ground. In an example case of FIG. 23, the center of the sphere 200 is set as the origin 201, and a camera 202 is disposed outside the sphere 200 on the Z-axis passing through the origin 201 to capture and acquire a scene for generating the partial image. It should be noted that the sphere 200 is a virtual sphere, and the camera 202 is a virtual image capture, which are implemented in the computing process in the information processing apparatus 100.

As described in the first to third embodiments, the parameters include, for example, a viewpoint specified as a desired position in a partial image, and an angle of view "α" indicating a range of angle capturable by the camera 202.

As illustrated in FIG. 23, the parameters further include camera coordinates indicating a position of the camera 202, camera UP indicating the upward direction of the camera 202 as a vector, camera gazing point coordinates indicating a point that the camera 202 is gazing (i.e., gazing point), and a radius of the sphere 200 that is a virtual three dimensional object used for mapping a full-view spherical image. Hereinafter, the camera gazing point may be also referred to as the gazing point.

These parameters are just examples, and other parameters can be set. It should be noted that these parameters are parameters necessary for changing the projection type or projection mode.

In an example case illustrated in FIG. 23, the radius of the sphere 200 is set one (1), the gazing point is set at the origin 201 of the sphere 200, the angle of view "α" is set with 120 degrees, the camera coordinates is set as (0, 0, −1.8), and the camera UP is set as (0, 1, 0).

Hereinafter, a description is given of the projection types or modes with reference to FIGS. 24 to 26. It should be noted that the projection types or modes illustrated in FIGS. 24 to 26 are just examples, and the projection types or modes are not limited thereto. Hereinafter, similar to an example illustrated in FIG. 23, it is assumed that a full-view spherical image is mapped onto the surface of the sphere 200, in which the sphere 200 has a radius of one (1), the sphere 200 has the center at the origin 201, and the sphere 200 is expressed on the two dimensional plane represented by the Y axis and the Z axis as illustrated in FIGS. 24 to 26.

FIG. 24 illustrates an example of a first projection type or mode viewing images by disposing the camera 202 outside the sphere 200. When the first projection type is applied, an image such as a wide range image (e.g., panoramic image) mapped on a surface of a mirror ball can be displayed.

When the first projection type is applied, as illustrated in FIG. 24A, the gazing point is set at the origin 201 that is the center of the sphere 200, and the camera 202 is disposed at a position outside the radius of the sphere 200. For example, the camera 202 is disposed at a position distanced from the origin 201 for "1.8" on the Z axis outside the sphere 200, and the angle of view "α" is set with, for example, 120 degrees. Therefore, as illustrated in FIG. 24B, the parameters include the angle of view "α" of 120 degrees, the gazing point coordinates of (0, 0, 0), the camera coordinates of (0, 0, −1.8), and the camera UP of (0, 1, 0).

FIG. 25 illustrates an example of a second projection type or mode viewing images in the entire inside of the sphere 200 from the upper side by setting Y coordinate of the camera 202 equal to the radius of the sphere 200. When the second projection type is applied, an image such as a person, a building or the like standing on a smaller planet can be displayed.

When the second projection type is applied, as illustrated in FIG. 25A, the camera 202 is disposed inside the sphere 200 close to the boundary of the sphere 200 as much as possible, the angle of view "α" is set with a ultra-wide angle of 170 degrees, and the gazing point is set at the origin 201. Therefore, as illustrated in FIG. 25B, the parameters include, for example, the angle of view "α" of 170 degrees, the gazing point coordinates of (0, 0, 0), the camera coordinates of (0, 1, 0), and camera UP of (0, 0, 1).

FIG. 26 illustrates an example of a third projection type or mode viewing images on the sphere 200 from the origin 201 by disposing the camera 202 at the origin 201. When the third projection type is applied, an image radially extending from the center toward the periphery can be displayed.

When the third projection type is applied, as illustrated in FIG. 26A, the camera 202 is disposed at the origin 201, and an intersection point of the circle representing the surface of the sphere 200 and the Z axis is set as the gazing point. Therefore, as illustrated in FIG. 26B, the parameters include, for example, the angle of view "α" of 205 degrees, the gazing point coordinates of (0, 0, 1), the camera coordinates of (0, 0, 0), and the camera UP of (0, 1, 0).

As to the first to the third embodiments, one of the projection types such as the first projection type is used to register the viewpoints (e.g., viewpoint 1, viewpoint 2, . . . , viewpoint N) and connect the adjacent two registered viewpoints to execute the preview playing of the animation. Therefore, the projection type is set same for all of the viewpoints. Further, since the gazing point is set at the origin 201, the gazing point is not considered as the parameter.

By contrast, in the fourth embodiment, each viewpoint and each gazing point are registered using different projection types such as the first projection type for the viewpoint 1, the second projection type for the viewpoint 2, in which the preview playing is performed by changing the projection types while transiting the viewpoints and the gazing points.

Hereinafter, a description is given of a method of selecting the projection type with reference to FIG. 27. When a user selects a to-be-displayed full-view spherical image file, and displays a partial image using one projection type, the user selects a "type selection" button displayed on the section 23 of the display 18 (e.g., touch panel) of a smart phone as illustrated in FIG. 27(*a*) before performing operations such as pan, tilt, zoom in, and zoom out operations to the displayed partial image on the section 20, as needed, to switch a screen illustrated in FIG. 27(*a*) to a screen used for selecting the projection type illustrated in FIG. 27(*b*).

Figure 27:
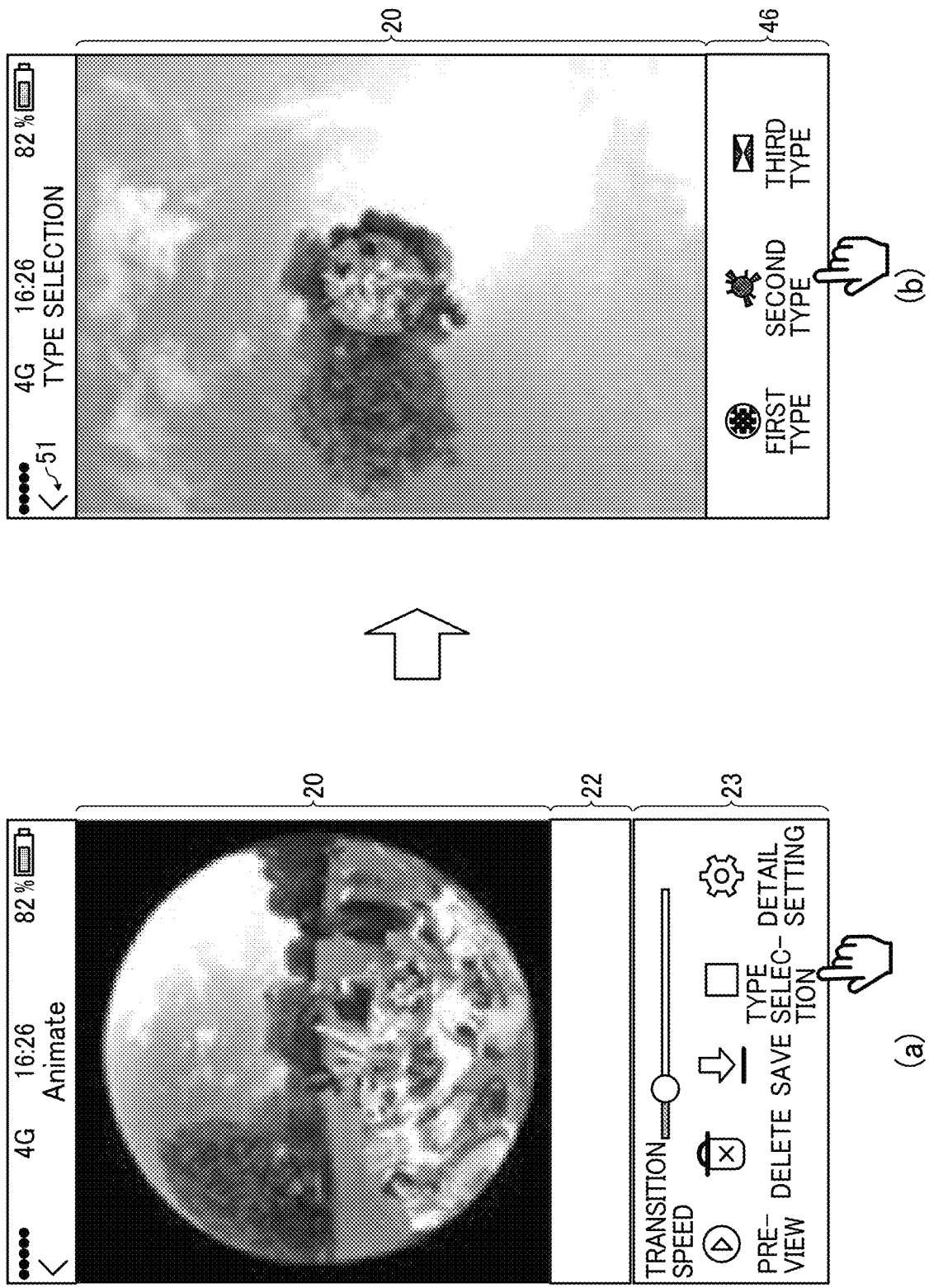
FIG. 27 illustrate an example of an application screen when setting a projection type.

The user can select one button from the "first projection type" button, the "second projection type" button, and the "third projection type" button displayed on the section 46 of the application screen as illustrated in FIG. 27(*b*). In this configuration, one of the projection types can be set as a default projection type. When the user wants to perform a registration of the viewpoint using a projection type other than the default projection type, the user can select a desired projection type. In an example case illustrated in FIG. 27(*b*), the "second projection type" button is selected by the user. After selecting the projection type, one partial image is switched to another partial image applied with the selected projection type, in which a return button 51 used for returning to the previous partial image is displayed at a upper side of the section 20 as illustrated in FIG. 27(*b*). When the return button 51 is pressed, another partial image illustrated in FIG. 27(*b*) is returned to the previous partial image illustrated in FIG. 27(*a*).

In the information processing apparatus 100 of the fourth embodiment, the display unit 102 receives a selection of the projection type in response to an operation of the user. The display unit 102 updates one partial image, which is currently being displayed, to another partial image applied with the selected projection type. When the projection type is not selected and the projection type is not changed, this processing is not executed.

Specifically, the display unit 102 receives the selection of the projection type, acquires one or more parameters associated with the selected projection type from the parameters set as the projection information as illustrated in FIGS. 24B, 25B, and 26B, generates a partial image applied with the selected projection type using the acquired one or more parameters, and switches the partial image, which are currently being displayed, to the generated partial image.

Then, similar to the first to third embodiments, the user performs a given operation such as a long press or double tap to designate a desired position in the partial image displayed on the section 20 as the viewpoint 1. When the user designates the viewpoint 1, the user can change the display magnification by using the zoom-in or zoom-out operation.

In response to this operation, the application screen displays an icon indicating that the viewpoint 1 is registered at the position designated by the user within the partial image, and displays an icon of a thumbnail image used for calling the viewpoint 1 on the section 22.

Then, the user can select the "type selection" button displayed on the section 23 (FIG. 27(*a*)) to switch the application screen, and then selects one button among the "first projection type" button, the "second projection type" button, and the "third projection type" button displayed on the section 46 (FIG. 27(*b*)). The display unit 102 switches the currently-being-displayed partial image to the partial image applied with the selected projection type to update the partial image. In this case too, when the projection type is not selected, and the projection type is not changed, this processing is not executed.

Then, the use designates a desired position in the displayed partial image as the viewpoint 2. When the user designates the viewpoint 2, the user can change the display magnification by using the zoom-in or zoom-out operation. In response to this operation, the application screen displays an icon indicating that the viewpoint 2 is registered at the position designated by the user within the partial image, and displays an icon of a thumbnail image used for calling the viewpoint 2 on the section 22.

By repeating the above described operation, viewpoint 3, viewpoint 4, . . . , and viewpoint N can be added in succession to the viewpoint 1 and the viewpoint 2. Also in this case, when the number of the registered viewpoint becomes two or more, a preview of the animation connecting the two or more registered viewpoints can be played.

Figure 28:
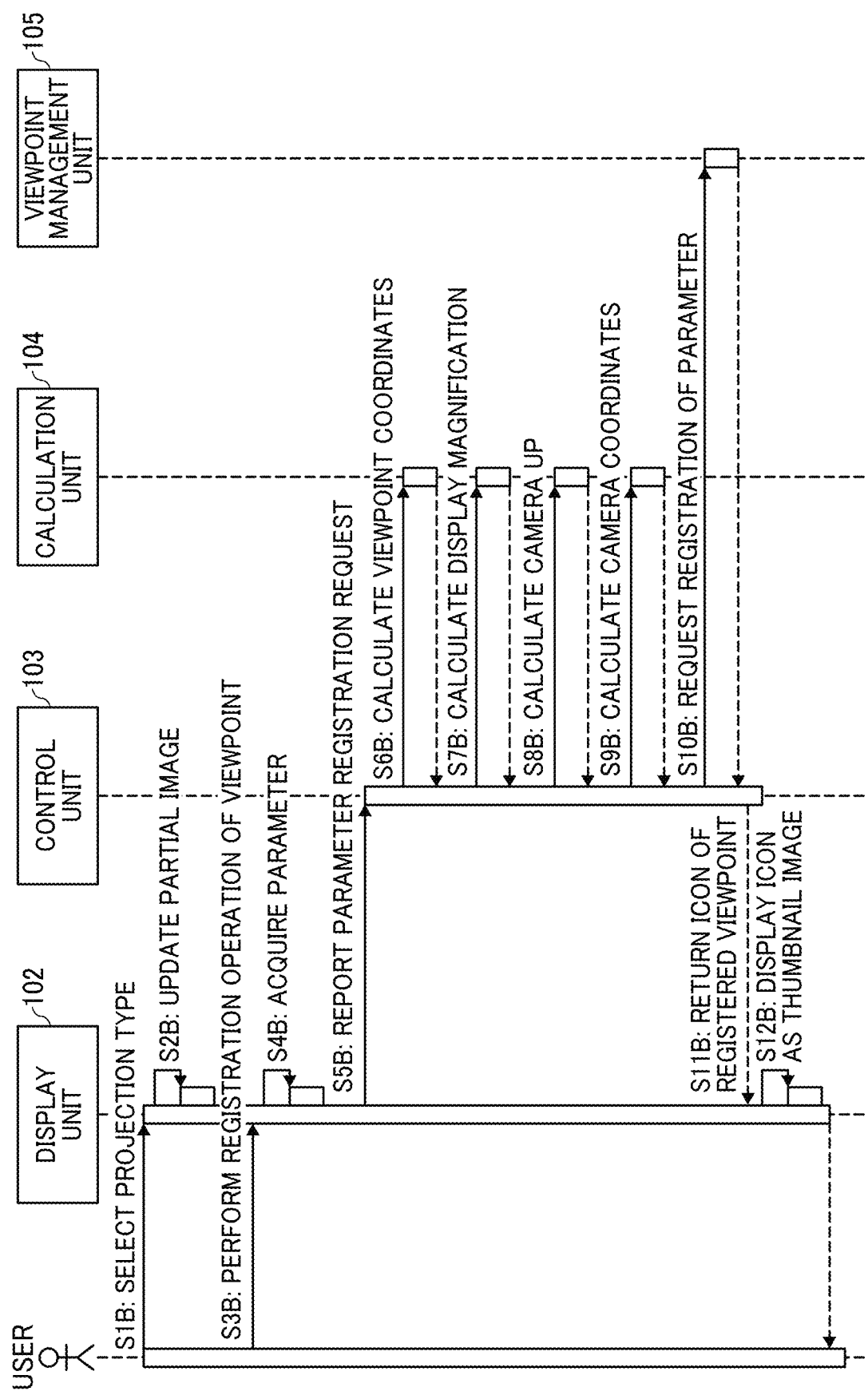
FIG. 28 illustrates another example of a sequence diagram of processing when registering a viewpoint.

Hereinafter, a description is given of processing that is performed when a viewpoint is registered by the information processing apparatus 100 with reference to a sequence diagram illustrated in FIG. 28. At first, a user selects a projection type prior to the viewpoint registration operation (S1B). In response to this projection type selection operation, the display unit 102 acquires one or more parameters associated with the selected projection type.

The parameter means one or more values set for each projection type such as the camera coordinates used for displaying a partial image for each projection type, and managed by the viewpoint management unit 105 by using a parameter table. Specifically, the parameter table can be set as illustrated in FIGS. 24B, 25B, and 26B. Therefore, the display unit 102 reports the selected projection type to the viewpoint management unit 105, acquires one or more parameters associated with the selected projection type from the viewpoint management unit 105, in which the parameter means an initial value (i.e., default value) of the camera coordinates or the like set in advance.

When the selected projection type is the first projection type, and the parameters such as the camera coordinates, the angle of view "α", the gazing point coordinates, the camera UP are acquired, the display unit 102 maps a full-view spherical image on a surface of the sphere 200 having the radius, sets the camera 202 at the camera coordinates, sets the direction of the camera UP to the upward direction of the camera 202, generates a partial image setting a focus on the gazing point coordinates using the acquired angle of view "α", and switches a partial image, which is currently being displayed, to a generated partial image to update the partial image.

Since the processing from the viewpoint registration operation by the user (S3B) to the calculation of the current display magnification (S7B) is same as the processing of S2 to S5 illustrated in FIG. 13, a description of the processing from S3B to S7B is omitted.

When the viewpoint registration operation is performed, the viewpoint is changed, and the display magnification is changed, and thereby the viewpoint coordinates is calculated at S6B, and the display magnification is calculated at S7B. Further, when the viewpoint registration operation is performed, the upward direction of the camera 202 and the camera coordinates of the camera 202 are changed by changing the viewpoints and others, and thereby the upward direction of the camera 202 and the camera coordinates of the camera 202 are also required to be calculated.

Therefore, the control unit 103 instructs the calculation unit 104 to calculate the camera UP, and acquires a calculation result of the camera UP (S8B). The camera UP can be calculated from information of the upward direction of the full-view spherical image when designating the viewpoint, the viewpoint coordinates (i.e., spherical coordinates of viewpoint) calculated at step S6B, and the gazing point coordinates.

When the first projection type and the second projection type are applied, the gazing point coordinates is set at the coordinates of (0, 0, 0) that is the origin 201 of the sphere 200, and thereby the gazing point coordinates is not required to be calculated. By contrast, when the third projection type is applied, the gazing point coordinates is calculated as an intersection point coordinates of the circle representing the surface of the sphere 200 and the straight line indicating a camera gazing direction extending from the camera 202 set at the origin 201. The camera UP indicates a direction perpendicular to a straight line extending in a viewing direction of the camera 202, and is calculated as a vector setting the upward direction of the image as the upward direction of the camera 202. When the gazing point coordinates is required to be calculated, the calculation is instructed, and the calculation result of the gazing point coordinates can be acquired at S8B.

The control unit 103 instructs the calculation unit 104 to calculate the camera coordinates, and acquires a calculation result of the camera coordinates (S9B). The camera coordinates is calculated based on the viewpoint coordinates calculated at step S6B, the display magnification calculated at step S7B, and the gazing point coordinates.

The display magnification causes a change of the angle of view "α" in accordance with the magnification level, and causes a change of focal distance determining a distance from the gazing point to the camera 202 depending on a value of the angle of view "α". Therefore, when the distance from the gazing point to the camera 202 is calculated based on the display magnification, the camera coordinates can be calculated, for example, based on the viewing direction of the camera 202 determined by the viewpoint coordinates, and the calculated distance. The above described calculation method is just one example. As long as the camera UP and the camera coordinates can be calculated, other methods can be used.

Since the processing from S10B to S12B is same as the processing from S6 to S8 illustrated in FIG. 13, the description of S10B to S12B is omitted.

When the parameter is registered (SB10), the viewpoint management unit 105 registers each value in the viewpoint information management table. The viewpoint information management table of the fourth embodiment includes a field for storing the selected projection type, a field for storing the camera UP, a field for storing the camera coordinates, and a field for storing the gazing point coordinates, in which the viewpoint management unit 105 registers the selected projection type and the calculated values in the respective fields. As to the angle of view "α", the angle of view "α" can be stored as the display magnification, which is the zoom magnification with respect to the initial angle of view "α", or the value of the angle of view "α" can be stored separately from the display magnification.

Each time the user performs the viewpoint registration operation, the processing of from S1B to S12B is repeatedly executed, in which the viewpoints designated by the user are registered in the viewpoint management table based on the designation order of the registered viewpoints.

Hereinafter, a description is given of a transition of viewpoints when a preview is played for two registered viewpoints set with different projection types with reference to FIGS. 29 to 31.

Figure 29:
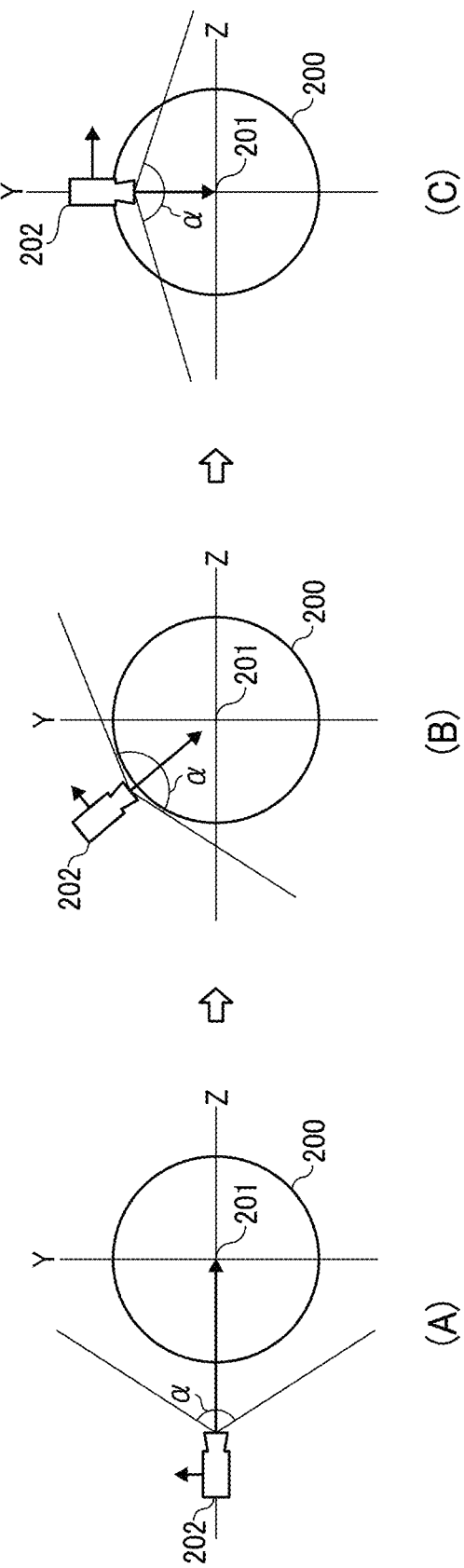
FIGS. 29A and 29B illustrate an example of a transition of animation between different projection types.

FIG. 29 illustrates a scheme of transition of viewpoints from the viewpoint 1 set with the first projection type to the viewpoint 2 set with the second projection type. In an example case of FIG. 29A, a status (A) is same as the first projection type illustrated in FIG. 24A, and a status (C) is same as the second projection type illustrated in FIG. 25A. A status (B) indicates a status that is at the middle of the transition of viewpoints. In example cases of FIGS. 29 to 31, the viewpoints transit along the transition path from the viewpoint 1 at the status (A) to the viewpoint 2 at the status (C), in which a viewpoint at the status (B) is at any intermediate position between the viewpoint 1 and the viewpoint 2. In order to simplify the illustration and description, the viewpoint at the status (B) is set at the middle position between the viewpoint 1 and the viewpoint 2. As above described, each viewpoint corresponds to each frame, which is each partial image, configuring one animation. The number of frames configuring the one animation can be set any numbers. In example cases of FIGS. 29 to 31, it is assumed that one animation includes three frames respectively corresponding the viewpoint 1 at the status (A), the viewpoint at the status (B), and the viewpoint 2 at the status (B).

When the status transits from the status (A) to the status (C), the gazing point is same (i.e., origin 201) for both of the status (A) and the status (C) while the angle of view "α", the camera coordinates, and the camera UP are changed between the status (A) and the status (C) Therefore, the viewpoints transit along a transition path interpolating between the viewpoints, and the angle of view "α", the camera coordinates, and the camera UP are also transited by interpolating between the viewpoints.

Since the parameters set for the status (A) and the parameters set for the status (C) are respectively same as the parameters illustrated in FIG. 24B and FIG. 25B, the parameters are not described. The viewpoint control unit 106 calculates an angle of view "α" during the transition based on the angle of view "α" at the status (A) and the angle of view "α" at the status (C). Specifically, the viewpoint control unit 106 calculates a shift value of the angle of view "α" of each frame based on a difference between the angle of view "α" at the viewpoint 1 and the angle of view "α" at the viewpoint 2.

As illustrated in FIG. 29B, since the angle of view "α" at the viewpoint 1 (status (A)) is 120 degrees, and the angle of view "α" at the viewpoint 2 (status (C)) is 170 degrees, the difference of the angle of view "α" between the viewpoint 1 and the viewpoint 2 becomes 50 degrees. The angle of view "α" at the status (B) during the transition is calculated by adding the shift value of the angle of view "α" from the viewpoint 1 to the middle position, which is calculated based on the difference of the angle of view "α" and a frame position at the status (B), to the angle of view "α" at the viewpoint 1. In this example case, the angle of 25 degrees, which is a half of the difference of 50 degrees between the angle of view "α" at the status (A) and the angle of view "α" at the camera coordinates at the status (C) is added to the angle view of 120 degrees at the viewpoint 1 to calculate 145 degrees as the angle of view "α" at the status (B).

The viewpoint control unit 106 calculates the camera coordinates during the transition based on the camera coordinates at the status (A) and the camera coordinates at the status (C). Specifically, the viewpoint control unit 106 calculates the shift value of the camera coordinates for each frame based on the distance between the camera coordinates at the viewpoint 1 and the camera coordinates at the viewpoint 2.

The camera coordinates at the status (B) during the transition is calculated by adding the shift value of the camera coordinates from the viewpoint 1 to the middle position, which is calculated based on the distance between the viewpoint 1 and the viewpoint 2 and a frame position at the status (B), to the camera coordinates at the viewpoint 1. In this example case, the distance in the Y axis direction between the viewpoint 1 and the viewpoint 2 is set one (1), and the distance in the Z axis direction between the viewpoint 1 and the viewpoint 2 is set 1.8. The camera coordinates at the status (B) is calculated by adding 0.5 (i.e., half of 1) and 0.9 (i.e., half of 1.8) respectively to they coordinate and the z coordinate of the camera coordinates of (0, 0, −1.8) at the viewpoint 1 to obtain the camera coordinates of (0, 0.5, −0.9) at the status (B) In this example case, the distance in the Y axis direction and the distance in the Z axis direction are respectively added with the values because the viewpoints transits to the direction that the value becomes greater in both of the y coordinate and the z coordinate along a direction from the viewpoint 1 to the viewpoint 2.

The viewpoint control unit 106 calculates the camera UP at the status (B) during the transition based on the camera UP at the status (A) and the camera UP at the status (C). Specifically, the viewpoint control unit 106 calculates a shift value of the camera UP for each frame based on the rotation angle obtained from the camera UP at the viewpoint 1 and the camera UP at the viewpoint 2.

The camera UP at the status (B) during the transition is calculated by adding the shift value of the camera UP from the viewpoint 1 to the middle position, which is calculated based on the rotation angle and a frame position at the status (B), to the camera UP at the viewpoint 1, by subtracting the shift value of the camera UP from the viewpoint 1 to the middle position from the camera UP at the viewpoint 1, or by both adding and subtracting the shift value of the camera UP for the camera UP at the viewpoint 1.

As illustrated in FIG. 29B, since the camera UP at the viewpoint 1 is (0, 1, 0) and the camera UP at the viewpoint 2 is (0, 0, 1), the upward direction of the camera 202 is rotated for 90 degrees from the Y axis to the Z axis direction. In this example case, the camera UP at the status (B) during the transition is calculated by subtracting 0.5 for the y coordinate and adding 0.5 for the z coordinate for the camera UP of (0, 1, 0) at the viewpoint 1 to obtain the camera UP of (0, 0.5, 0.5) at the status (B), in which 0.5 corresponds to an angle of 45 degrees that is a half of the rotation angle of 90 degrees. In this example case, the y coordinate receives the subtraction and the z coordinate receives the addition because the viewpoints transit to the direction that the value becomes smaller for the y coordinate, and the value becomes greater for the z coordinate.

Figure 30:
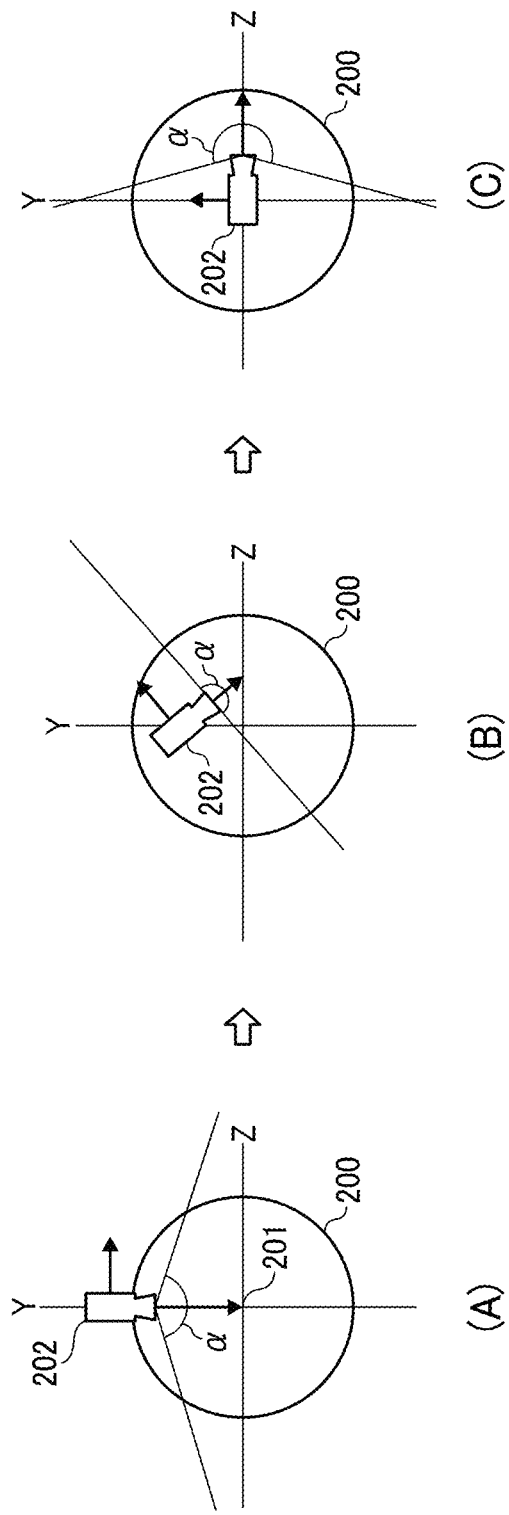
FIGS. 30A and 30B illustrate another example of a transition of animation between different projection types.

FIG. 30 illustrates a scheme of transition of viewpoints from the viewpoint 1 set with the second projection type to the viewpoint 2 set with the third projection type. In an example case of FIG. 30(a), a status (A) is same as the second projection type illustrated in FIG. 25A, and a status (C) is same as the third projection type illustrated in FIG. 26A. A status (B) indicates a status that is at the middle of the transition of viewpoints.

When the status transits from the status (A) to the status (C), all of the angle of view "α", the camera coordinates, the camera UP, and the gazing point coordinates are changed between the status (A) and the status (C). Therefore, when the viewpoints transit along a transition path interpolating between the viewpoints, the angle of view "α", the camera coordinates, the camera UP, and the gazing point coordinates are also transited by interpolating between the viewpoints.

Since the parameters se for the status (A) and the parameters set for the status (C) are respectively same as the parameters illustrated in FIG. 25B and FIG. 26B, the parameters are not described. The viewpoint control unit 106 calculates an angle of view "α" during the transition based on the angle of view "α" at the status (A) and the angle of view "α" at the status (C) using the method described with reference to FIG. 29.

In this example case, the angle of view "α" at the status (B) during the transition is calculated by adding the shift value of 17.5 degrees, which is a half of the difference of 35 degrees between the angle of view "α" at the status (A) and the angle of view "α" at the status (C), to the angle of view "α" of 170 degrees at the viewpoint 1 to calculate 187.5 degrees as the angle of view "α" at the status (B).

The viewpoint control unit 106 calculates the camera coordinates during the transition based on the camera coordinates at the status (A) and the camera coordinates at the status (C) using the method described with reference to FIG. 29.

In this example case, the camera coordinates at the status (B) is calculated by subtracting the shift value of 0.5 for the y coordinate from the camera coordinates of (0, 1, 0) at the viewpoint 1 to obtain the camera coordinates of (0, 0.5, 0) at the status (B). In this example case, the total sum of the shift value of the distance in the Y axis direction between the viewpoint 1 and the viewpoint 2 is one (1), and 0.5 is a half of 1.

The viewpoint control unit 106 calculates the camera UP at the status (B) during the transition based on the camera UP at the status (A) and the camera UP at the status (C) using the method described with reference to FIG. 29.

As illustrated in FIG. 30B, since the camera UP at the viewpoint 1 is (0, 0, 1) and the camera UP at the viewpoint 2 is (0, 1, 0), the upward direction of the camera 202 is rotated for 90 degrees from the Z axis to the Y axis direction. In this example case, the camera UP at the status (B) during the transition is calculated by adding the shift value of 0.5 for the y coordinate, and subtracting the shift value of 0.5 for the z coordinate for the camera UP of (0, 0, 1) at the status (A) to obtain the camera UP of (0, 0.5, 0.5) at the status (B), in which 0.5 corresponds to an angle of 45 degrees that is a half of the rotation angle of 90 degrees between the status (A) and the status (C).

The viewpoint control unit 106 calculates the gazing point coordinates at the status (B) during the transition based on the gazing point coordinates at the status (A) and the gazing point coordinates at the status (C). Specifically, the viewpoint control unit 106 calculates the shift value of the gazing point for each frame based on the distance between a gazing point 1 at the viewpoint 1 and a gazing point 2 at the second viewpoint 2.

The gazing point coordinates at the status (B) during the transition is calculated by adding the shift value of 0.5 for the z coordinate to the gazing point coordinates of (0, 0, 0) at the viewpoint 1 to obtain the gazing point coordinates of (0, 0, 0.5) at the status (B). The shift value of 0.5 is a half of the distance of one (1) in the Z-axis direction between the gazing point at the viewpoint 1 and the gazing point at the viewpoint 2.

Figure 31:
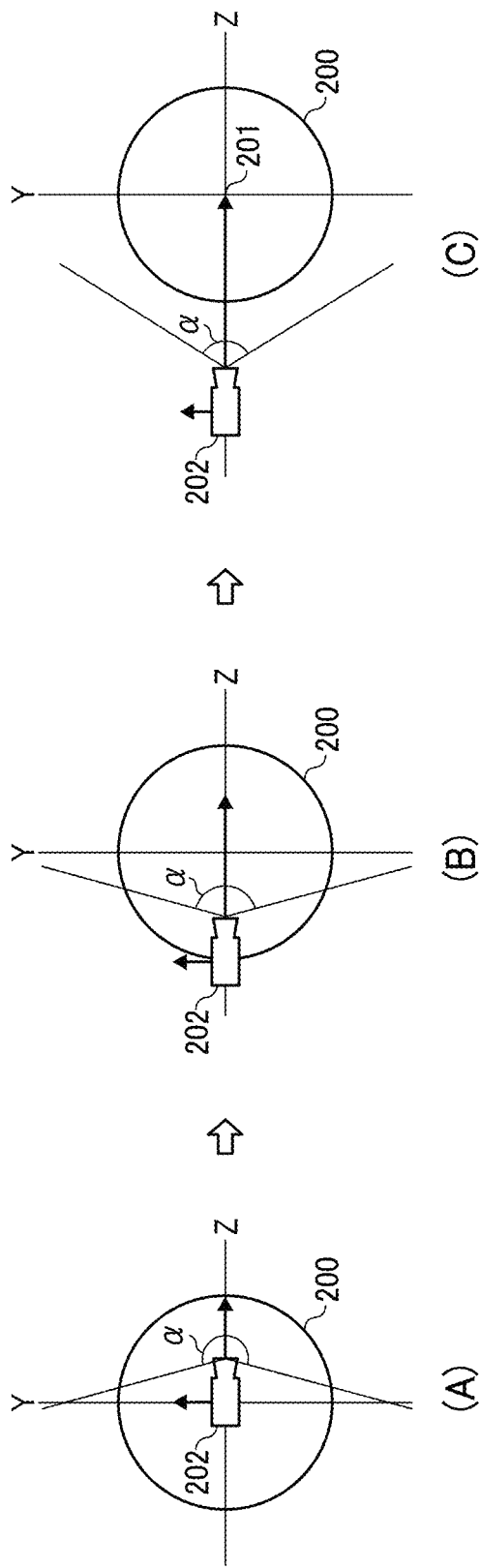
FIGS. 31A and 31B illustrate another example of a transition of animation between different projection types.

FIG. 31 illustrates a scheme of transition of viewpoints from the viewpoint 1 set with the third projection type to the viewpoint 2 set with the first projection type. In an example case of FIG. 31A, a status (A) is same as the third projection type illustrated in FIG. 26A, and a status (C) is same as the first projection type illustrated in FIG. 24A. A status (B) indicates a status that is at the middle of the transition of viewpoints.

When the status transits from the status (A) to the status (C), the camera UP is same for both of the status (A) and the status (C) while the angle of view "α", the camera coordinates, and the gazing point coordinates are changed between the status (A) and the status (C) Therefore, when the viewpoints transit along a transition path interpolating between the viewpoints, the angle of view "α", the camera coordinates, and the gazing point coordinates are also transited by interpolating between the viewpoints.

Since the parameters set for the status (A) and the parameters set for the status (C) are respectively same as the parameters illustrated in FIG. 26B and FIG. 24B, the parameters are not described. The viewpoint control unit 106 calculates an angle of view "α" during the transition based on the angle of view "α" at the status (A) and the angle of view "α" at the status (C) using the method described with reference to FIG. 29.

In this example case, the angle of view "α" at the status (B) during the transition is calculated by subtracting the shift value of 42.5 degrees, which is a half of the difference of 85 degrees between the angle of view "α" at the status (A) and the angle of view "α" at the status (C), from the angle of view "α" of 205 degrees at the viewpoint 1 to calculate 162.5 degrees as the angle of view "α" at the status (B).

The viewpoint control unit 106 calculates the camera coordinates during the transition based on the camera coordinates at the status (A) and the camera coordinates at the status (C) using the method described with reference to FIG. 29.

In this example case, the camera coordinates at the status (B) is calculated by subtracting the shift value of 0.9 for the y coordinate from the camera coordinates of (0, 0, 0) at the viewpoint 1 to obtain the camera coordinates of (0, 0, −0.9) at the status (B) In this example case, the total sum of the shift value of the distance in the Z axis direction between the viewpoint 1 and the viewpoint 2 is 1.8, and 0.9 is a half of 1.8.

The viewpoint control unit 106 calculates the gazing point coordinates at the status (B) during the transition based on the gazing point coordinates at the status (A) and the gazing point coordinates at the status (C) using the method described with reference to FIG. 30.

In this example case, the gazing point coordinates at the status (B) during the transition is calculated by subtracting the shift value of 0.5 for the z coordinate from the gazing point coordinates of (0, 0, 1) at the viewpoint 1 to obtain the gazing point coordinates of (0, 0, 0.5) at the status (B) In this example case, the total sum of the shift value of the distance in the Z-axis direction between the gazing point at the viewpoint 1 and the gazing point at the viewpoint 2 is one (1), and 0.5 is a half of one.

With reference to FIGS. 29 to 31, the transition from the first projection type to the second projection type, the transition from the second projection type to the third projection type, and the transition from the third projection type to the first projection type are described, but the transition patterns are not limited thereto. For example, a transition from the second projection type to the first projection type, a transition from the third projection to the second projection type, and a transition from the first projection type to the third projection type can be performed using the above described method, in which a partial image is generated based on a change of at least any one of the angle of view "α", the camera coordinates, the camera UP, and the gazing point coordinates for each frame, with which a smooth transition of the viewpoints, the gazing points, the camera UP and the zoom-in and/or zoom-out of the images can be performed when playing an animation. Further, by changing the projection type, a dynamic image expression using the full-view spherical image can be achieved.

Figure 32:
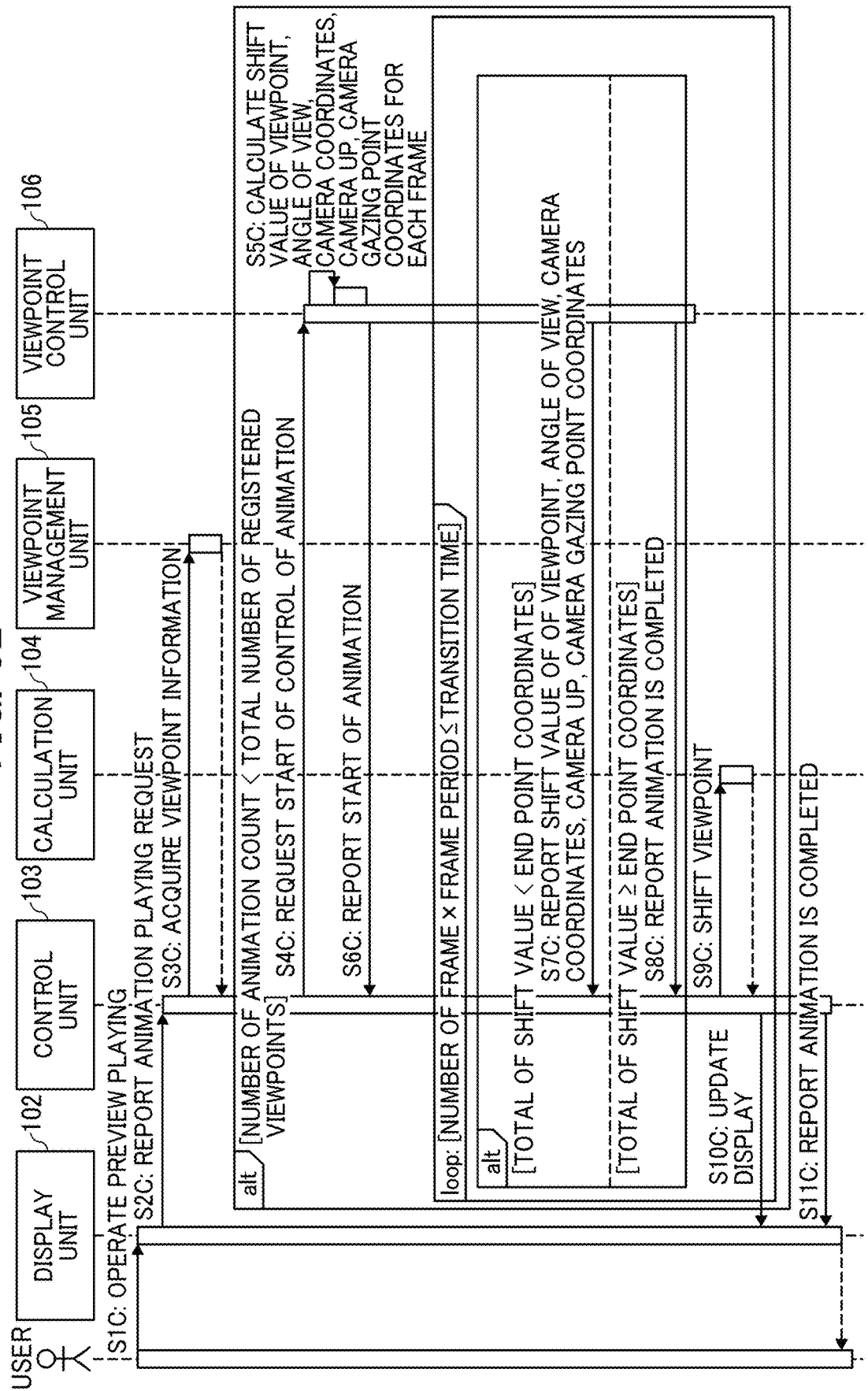
FIG. 32 illustrates another example of a sequence diagram of processing when playing a preview.

Hereinafter, a description is given of processing that is performed when playing the preview by the information processing apparatus 100 with reference to a sequence diagram illustrated in FIG. 32. The processing of the preview playing of FIG. 32 is almost same as the processing illustrated in FIG. 15 described as the first embodiment except processing at S5C and S7C, and thereby the processing at S5C and S7C are described.

At S5C, the viewpoint control unit 106 controls the transition of viewpoints along a transition path interpolating between the registered first viewpoint (i.e., start viewpoint) and the registered second viewpoint (i.e., end viewpoint). In this control process at step S5C, the viewpoint control unit 106 calculates the shift value of the viewpoint for each frame using the above described method, and also calculates the shift value of the angle of view "α", the shift value of the camera coordinates, the shift value of the camera UP, the shift value of the gazing point coordinates for each frame based on a projection type registered for the start viewpoint and a projection type registered for the end viewpoint.

At S7C, the viewpoint control unit 106 repeatedly reports the shift value of the viewpoint for each frame, the shift value of the angle of view "α", the shift value of the camera coordinates, the shift value of the camera UP, the shift value of the gazing point coordinates for each frame to the control unit 103 based on the projection type registered for the start viewpoint and the projection type registered for the end viewpoint until a value obtained by multiplying a frame period to the number of frames exceeds the transition time. At this timing, the shift direction such as addition and subtraction direction can be also reported.

With this configuration, by changing the projection types or modes set for each of the registered viewpoints, an image expression of the full-view spherical image can be performed with various patters, which cannot be expressed by changing the viewpoints and the angle of view "α" alone.

Further, in the fourth embodiment, a user can set a viewpoint transition direction, which is the transition direction of the viewpoints, as a viewpoint parameter similar to the second embodiment, and the viewpoints can be transited along the set viewpoint transition direction. Further, in the fourth embodiment, the animation can be performed automatically, the animation can be cropped, and the animation can be synthesized with the background audio and played using the preset data described in the third embodiment.

As to the above described information processing apparatus of the embodiments in this disclosure, the information processing apparatus can present or display an area of interest in a full-view spherical image easily while reducing time and effort of a user operation.

The above-described functions of the embodiments can be implemented by executing one or more programs, written in C, C++, C #, Java (registered trademark), and the one or more programs can be stored in any storage medium, carrier medium, carrier means, or digital data carrier for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), and distributed as a storage medium such as a hard disk, a CD-ROM, an MO, a DVD, a flexible disk, EEPROM, EPROM, and further, the one or more programs can be stored in other devices, from which the one or more programs can be transmitted through a network.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits. A processing circuit includes a programmed processor. A processing circuit also includes devices such as an application specific integrated circuit (ASIC) and conventional circuit components arranged to perform the recited functions.

What is claimed is:

1. An information processing apparatus, comprising:
circuitry configured to
receive selection of a first projection mode indicating a relative position of a virtual image capture so as to constrain a location of a first viewpoint, the first projection mode being selected by a user as one of inside, on, and outside a surface of a virtual three-dimensional object;
receive designation of the first viewpoint, the location of the first viewpoint being constrained by the selected first projection mode to be one of inside, on, and outside the surface of the virtual three-dimensional object;
register at least the first viewpoint and a second viewpoint, the second viewpoint being designated next to the first viewpoint, as viewpoints in a full-view, 360-degree spherical image that is mapped onto the surface of the virtual three-dimensional object;

set a transition path of the viewpoints by interpolating between the first viewpoint and the second viewpoint in the full-view spherical image;

generate a first partial image matching the first viewpoint, and generate a second partial image matching the second viewpoint; and play an animation by sequentially displaying partial images while transitioning the viewpoints from the first partial image to the second partial image along the set transition path.

2. The information processing apparatus of claim 1, wherein the circuitry is further configured to register the first viewpoint and a first angle of view designated by the user in association with each other, and register the second viewpoint and a second angle of view designated by the user in association with each other, and wherein the circuitry is further configured to generate the first partial image based on the first angle of view associated with the first viewpoint, and generate the second partial image based on the second angle of view associated with the second viewpoint.

3. The information processing apparatus of claim 2, wherein the circuitry is further configured to generate an intermediate angle of view for an intermediate viewpoint by interpolating between the first and second angles of view.

4. The information processing apparatus of claim 1, wherein the circuitry is further configured to register at least one of a transition speed and a transition time, and transition the viewpoints from the first viewpoint to the second viewpoint along the set transition path by applying the at least one of the transition speed and the transition time.

5. The information processing apparatus of claim 1, wherein the circuitry is further configured to register a first transition direction in association with the first viewpoint, and transition the viewpoints from the first viewpoint to the second viewpoint along the transition path set by the first transition direction.

6. The information processing apparatus of claim 1, wherein the circuitry is further configured to convert the first and second partial images, as well as partial images at multiple viewpoints along the set transition path, into movie image data.

7. The information processing apparatus of claim 6, further comprising:

a display to display a first icon corresponding to the first viewpoint, and a second icon corresponding to the second viewpoint respectively as a first thumbnail image and a second thumbnail image.

8. The information processing apparatus of claim 7, wherein the display receives editing of the first viewpoint and the second viewpoint designated by a user, and information registered in association with the first viewpoint and the second viewpoint.

9. The information processing apparatus of claim 7, wherein the circuitry is further configured to synthesize the movie image data with one or more background audio tracks.

10. The information processing apparatus of claim 7, wherein the display displays one or more selections of crop regions; and the circuitry is further configured to play the animation, sequentially displaying the first partial image and the second partial while cropping the animation by applying the crop region selected by the user.

11. The information processing apparatus of claim 7, further comprising a memory to store one or more preset data registering the first viewpoint and the second viewpoint in the full-view spherical image with an order designated by the user, the display displays the one or more preset data, and the circuitry is further configured to transition the viewpoints from the first viewpoint to the second viewpoint, next to the first viewpoint, registered in the preset data selected by the user, along the transition path set by applying the preset data selected by the user.

12. The information processing apparatus of claim 11, wherein the preset data includes a first angle of view registered in association with the first viewpoint, and a second angle of view registered in association with the second viewpoint, and the circuitry is further configured to generate the first partial image based on the first angle of view associated with the first viewpoint, and the second partial image based on the second angle of view associated with the second viewpoint registered in the preset data selected by the user.

13. The information processing apparatus of claim 12, wherein the display receives a change operation of the second viewpoint registered as an end viewpoint registered in the preset data selected by the user, and a change operation of the second angle of view associated with the second viewpoint registered as the end viewpoint in the preset data selected by the user, when the second viewpoint registered as the end viewpoint is changed, the circuitry is further configured to transition the viewpoints from the first viewpoint to the changed second viewpoint along the transition path interpolating between the first viewpoint and the changed second viewpoint, and when the second angle of view associated with the second viewpoint is changed, the circuitry is further configured to generate the second partial image based on the changed second angle of view.

14. The information processing apparatus of claim 7, wherein the display receives the selection of the first projection mode and a second projection mode used for projecting each of the first partial image and the second partial image, respectively on the display, the circuitry is further configured to register the first viewpoint and first projection information used for projecting the first partial image by the first projection mode in association with each other, and register the second viewpoint and second projection information used for projecting the second partial image by the second projection mode in association with each other, and the circuitry is further configured to generate the first partial image based on the first projection information associated with the first viewpoint, and the second partial image based on the second projection information associated with the second viewpoint.

15. The information processing apparatus of claim 1, wherein the circuitry is further configured to register first projection information of the first projection mode in association with the first viewpoint, and second projection information of a second projection mode in association with the second viewpoint.

16. The information processing apparatus of claim 1,
wherein the circuitry is further configured to register information of a first angle of view of the virtual image capture corresponding to the first viewpoint, the location of the first viewpoint, information indicating a first upward direction of the virtual image capture corresponding to the first viewpoint, and information indicating a first position of a first gazing point of the virtual image capture corresponding to the first viewpoint as first projection information to be used when the virtual image capture captures the first partial image, and the circuitry is further configured to register information of a second angle of view of a virtual image capture corresponding to the second viewpoint, a location of the second viewpoint, information indicating a second upward direction of the virtual image capture corresponding to the second viewpoint, and information indicating a second position of a second gazing point of the virtual image capture corresponding to the second viewpoint as second projection information to be used when the virtual image capture captures the second partial image.

17. The information processing apparatus of claim 16, wherein the circuitry is further configured to generate the information of the first and second angles of view, the information of the first and second viewpoints, the information indicating the first and second upward directions, and the information indicating the first and second positions of the first and second gazing points based on the first viewpoint and the second viewpoint respectively designated by the user, the first and second angles of view of the first viewpoint and the second viewpoint respectively designated by the user, information of the first and second upward directions of the full-view spherical image designated by the user when the user designates the first viewpoint and the second viewpoint, the first projection mode selected for the first viewpoint, and a second projection mode selected for the second viewpoint.

18. The information processing apparatus of claim 1, wherein the circuitry is further configured to generate the first partial image having a center that matches the first viewpoint, and the second partial image having a center that matches the second viewpoint.

19. An information processing method, comprising:
receiving selection of a first projection mode indicating a relative position of a virtual image capture so as to constrain a location of a first viewpoint, the first projection mode being selected by a user as one of inside, on, and outside a surface of a virtual three-dimensional object;
receiving designation of the first viewpoint, the location of the first viewpoint being constrained by the selected first projection mode to be one of inside, on, and outside the surface of the virtual three-dimensional object;
registering at least the first viewpoint and a second viewpoint, the second viewpoint being designated next to the first viewpoint, as viewpoints in a full-view, 360-degree spherical image that is mapped onto the surface of the virtual three-dimensional object;
setting a transition path of the viewpoints by interpolating between the first viewpoint and the second viewpoint in the full-view spherical image;
generating a first partial image matching the first viewpoint, and generate a second partial image matching the second viewpoint; and
playing an animation by sequentially displaying partial images while transitioning the viewpoints from the first partial image to the second partial image along the set transition path.

20. A non-transitory computer-readable medium storing a program that, when executed by processing circuitry, causes the processing circuitry to perform a method, comprising:
receiving selection of a first projection mode indicating a relative position of a virtual image capture so as to constrain a location of a first viewpoint, the first projection mode being selected by a user as one of inside, on, and outside a surface of a virtual three-dimensional object;
receiving designation of the first viewpoint, the location of the first viewpoint being constrained by the selected first projection mode to be one of inside, on, and outside the surface of the virtual three-dimensional object;
registering at least the first viewpoint and a second viewpoint, the second viewpoint being designated next to the first viewpoint, as viewpoints in a full-view, 360-degree spherical image that is mapped onto the surface of the virtual three-dimensional object;
setting a transition path of the viewpoints by interpolating between the first viewpoint and the second viewpoint in the full-view spherical image;
generating a first partial image matching the first viewpoint, and generate a second partial image matching the second viewpoint; and
playing an animation by sequentially displaying partial images while transitioning the viewpoints from the first partial image to the second partial image along the set transition path.

* * * * *